US011070828B2

(12) United States Patent
Toma et al.

(10) Patent No.: US 11,070,828 B2
(45) Date of Patent: Jul. 20, 2021

(54) METHOD FOR DECODING DATA, DATA DECODING DEVICE, AND METHOD FOR TRANSMITTING DATA

(71) Applicant: Panasonic Intellectual Property Corporation of America, Torrance, CA (US)

(72) Inventors: Tadamasa Toma, Osaka (JP); Noritaka Iguchi, Osaka (JP); Takahiro Nishi, Nara (JP); Hisaya Katou, Kyoto (JP)

(73) Assignee: SUN PATENT TRUST, New York, NY (US)

( * ) Notice: Subject to any disclaimer, the term of this patent is extended or adjusted under 35 U.S.C. 154(b) by 581 days.

(21) Appl. No.: 14/943,060

(22) Filed: Nov. 17, 2015

(65) Prior Publication Data

US 2016/0080755 A1    Mar. 17, 2016

Related U.S. Application Data

(63) Continuation of application No. PCT/JP2014/002936, filed on Jun. 3, 2014.

(Continued)

(30) Foreign Application Priority Data

May 23, 2014    (JP) .............................. JP2014-107476

(51) Int. Cl.
*H04N 19/423*    (2014.01)
*H04N 21/438*    (2011.01)
(Continued)

(52) U.S. Cl.
CPC .......... *H04N 19/423* (2014.11); *H04N 19/44* (2014.11); *H04N 21/438* (2013.01); *H04N 21/44004* (2013.01); *H04N 21/631* (2013.01)

(58) Field of Classification Search
CPC .... H04N 19/423; H04N 19/44; H04N 21/438; H04N 21/44004; H04N 21/631
(Continued)

(56) References Cited

U.S. PATENT DOCUMENTS

| 8,369,413 B2 * | 2/2013 | Yeh ........................ H04N 5/765 |
| | | 375/240.25 |
| 2003/0103524 A1 * | 6/2003 | Hasegawa .......... H04N 21/4316 |
| | | 370/465 |

(Continued)

FOREIGN PATENT DOCUMENTS

| JP | 2009-239444 | 10/2009 |
| JP | 5788622 | 10/2015 |

(Continued)

OTHER PUBLICATIONS

International Search Report of PCT application No. PCT/JP2014/002936 dated Aug. 26, 2014.
(Continued)

*Primary Examiner* — Farzana Hossain
(74) *Attorney, Agent, or Firm* — Wenderoth, Lind & Ponack, L.L.P.

(57) ABSTRACT

A method for decoding data of the present disclosure includes: a receiving step of receiving a plurality of encoded streams on a packet basis, the encoded streams being included in encoded data and having been transmitted using a plurality of respective transmission channels; a storing step of storing a plurality of packets of the received plurality of encoded streams, in a first buffer; a rearranging step of rearranging the plurality of packets stored in the first buffer, in a decoding order; and a decoding step of decoding the plurality of packets rearranged in the decoding order.

11 Claims, 31 Drawing Sheets

Related U.S. Application Data

(60) Provisional application No. 61/831,173, filed on Jun. 5, 2013.

(51) Int. Cl.
*H04N 21/44* (2011.01)
*H04N 21/63* (2011.01)
*H04N 19/44* (2014.01)

(58) Field of Classification Search
USPC .................................................. 375/240.25
See application file for complete search history.

(56) References Cited

U.S. PATENT DOCUMENTS

| | | | | |
|---|---|---|---|---|
| 2007/0071397 | A1* | 3/2007 | Nakamura | H04N 5/85 386/231 |
| 2009/0079872 | A1* | 3/2009 | Seong | H04N 5/44 348/588 |
| 2009/0116814 | A1* | 5/2009 | Morohashi | H04N 5/92 386/248 |
| 2009/0148131 | A1* | 6/2009 | Akgul | H04N 21/4382 386/355 |
| 2009/0262754 | A1* | 10/2009 | Yu | H03M 13/235 370/471 |
| 2009/0263104 | A1* | 10/2009 | Tsutsumi | H04L 47/564 386/248 |
| 2010/0333164 | A1* | 12/2010 | Schultz | H04H 20/59 725/151 |
| 2011/0255558 | A1 | 10/2011 | Hwang et al. | |
| 2011/0268178 | A1* | 11/2011 | Park | H04N 21/23439 375/240.02 |
| 2011/0271306 | A1* | 11/2011 | Kahn | H04N 7/162 725/68 |
| 2012/0240174 | A1 | 9/2012 | Rhyu et al. | |
| 2012/0254457 | A1* | 10/2012 | Condon | H04N 21/23439 709/231 |
| 2013/0003993 | A1* | 1/2013 | Michalski | H04H 20/74 381/119 |
| 2013/0094563 | A1 | 4/2013 | Bae | |
| 2013/0342648 | A1* | 12/2013 | Yim | H04N 21/2381 348/43 |
| 2014/0079368 | A1* | 3/2014 | Sasaki | H04N 5/0736 386/207 |
| 2014/0147088 | A1* | 5/2014 | Kawaguchi | H04N 13/0059 386/201 |
| 2014/0282799 | A1 | 9/2014 | Bae | |
| 2015/0373380 | A1* | 12/2015 | Tsukagoshi | H04L 5/0044 725/109 |
| 2016/0080755 | A1 | 3/2016 | Toma et al. | |

FOREIGN PATENT DOCUMENTS

| | | |
|---|---|---|
| KR | 10-2013-0040132 | 4/2013 |
| WO | 2013/055176 | 4/2013 |

OTHER PUBLICATIONS

"Study of ISO/IEC CD 23008-1 MPEG Media Transport" ISO/IEC JTC1/SC29/WG11 MPEG/N13089, Oct. 2012, pp. 108-110, 41-42, 9-10.
"Information technology—High efficiency coding and media delivery in heterogeneous environments—Part1:MPEG media transport(MMT)" ISO/IEC FDIS 23008-1, 2013.
Extended European Search report dated Apr. 29, 2016 in related European Application No. 14808058.3.
"ISO/IEC JTC1/SC29/WG11, Study of ISC/IEC CD 23008-1 MPEG Media Transport", Oct. 1, 2012 (Oct. 1, 2012), XP0055266106, Shanghai, China, Retrieved from the Internet: URL:http://mpeg.chiariglione.org/standards/mpeg-h/mpeg-media-transport/study-isoiec-cd-23008-1-mpeg-media-transport [retrieved on Apr. 18, 2016].

* cited by examiner

FIG. 9

| MPU MODE | AFTER WAITING UNTIL ALL DATA OF MPU BECOMES AVAILABLE, DATA IS READ FROM MMTB |
|---|---|
| Fragment MODE | AFTER WAITING UNTIL ALL DATA OF Fragment WHICH IS UNIT OF DIVISION OF MPU BECOMES AVAILABLE, DATA IS READ FROM MMTB |
| Media Unit MODE | WITHOUT WAITING UNTIL ALL DATA OF MPU OR Fragment BECOMES AVAILABLE, DATA IS READ FROM MMTB |

FIG. 23

| |
|---|
| VIDEO STREAM (PID = 0x1011 MAIN VIDEO) |
| AUDIO STREAM (PID = 0x1100) |
| AUDIO STREAM (PID = 0x1101) |
| PRESENTATION GRAPHICS STREAM (PID = 0x1200) |
| PRESENTATION GRAPHICS STREAM (PID = 0x1201) |
| INTERACTIVE GRAPHICS STREAM (PID = 0x1400) |
| VIDEO STREAM (PID = 0x1B00 SUBVIDEO) |
| VIDEO STREAM (PID = 0x1B01 SUBVIDEO) |

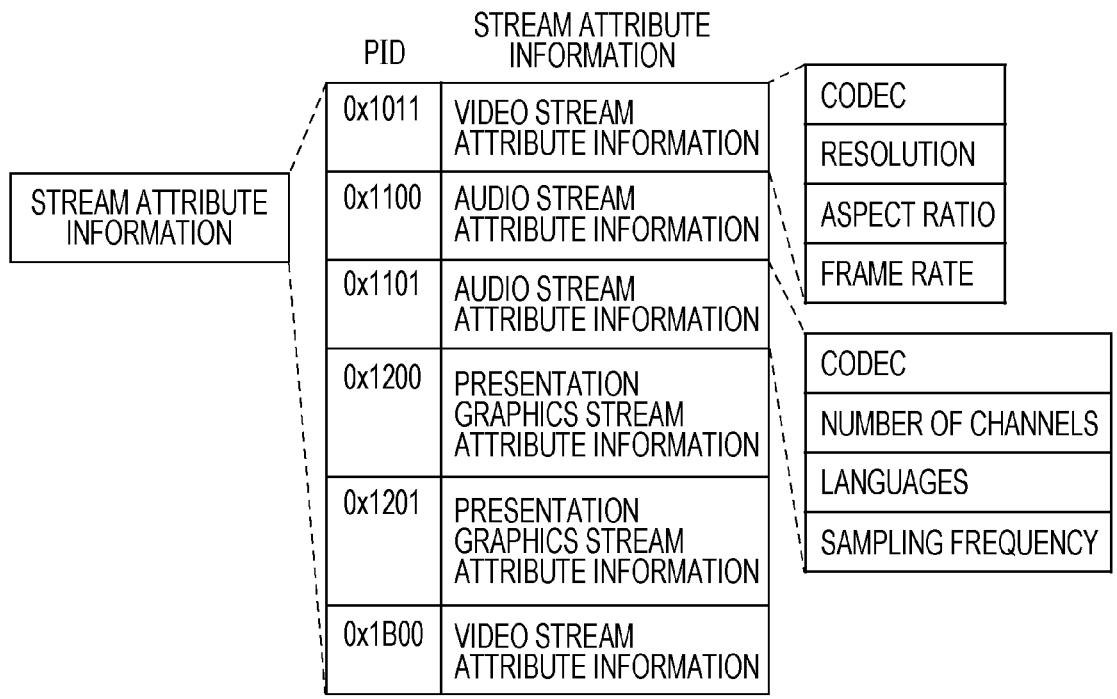

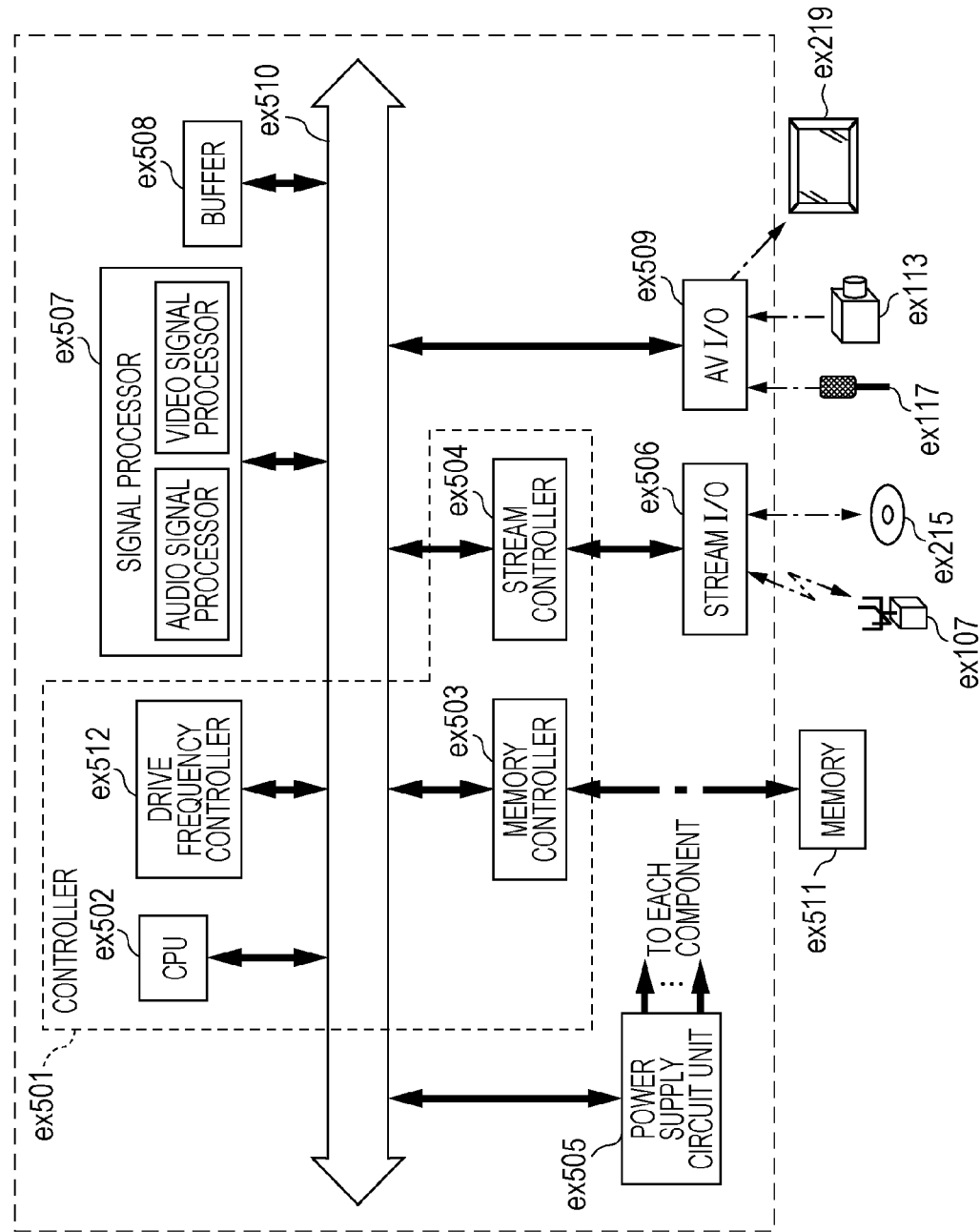

FIG. 34

| COMPLIANT STANDARD | DRIVE FREQUENCY |
|---|---|
| MPEG4.AVC | 500MHz |
| MPEG2 | 350MHz |
| ⋮ | ⋮ | ns
METHOD FOR DECODING DATA, DATA DECODING DEVICE, AND METHOD FOR TRANSMITTING DATA

BACKGROUND

1. Technical Field

The present disclosure relates to a method for decoding data, a data decoding device, and a method for transmitting data.

2. Description of the Related Art

Conventionally, there is known a technique for transmitting encoded data in a predetermined transmission format. The encoded data is generated by encoding content including video data and audio data, based on a moving image coding standard such as HEVC (High Efficiency Video Coding).

Examples of the predetermined transmission format include MPEG-2 TS (Moving Picture Experts Group-2 Transport Stream) and MMT (MPEG Media Transport) (see NPL 1). For example, PTL 1 discloses a technique for transmitting coded media data on a packet basis, according to MMT.

The above-described conventional technique discloses the technique for transmitting coded data, but does not disclose how to decode the transmitted coded data being received.

CITATION LIST

Patent Literature

PTL 1: U.S. Pat. No. 8,638,818

Non-Patent Literature

NPL 1: Information technology—High efficiency coding and media delivery in heterogeneous environment—Part 1: MPEG media transport (MMT), ISO/IEC DIS 23008-1

SUMMARY

In one general aspect, the techniques disclosed here feature a playback method including:

receiving a first packet group transmitted using a specified first transmission channel and a second packet group transmitted using a specified second transmission channel, wherein in each of packets of the first packet group and the second packet group, encoded data is stored on a predetermined unit basis, the encoded data being generated by encoding a video signal, wherein the encoded data is divided into a plurality of MPUs (Media Processing Units), wherein each of the plurality of MPUs is formed of a plurality of access units to be played back during a predetermined playback period, wherein in the packet, the encoded data is stored on an access unit basis or on a unit basis, the unit being one of a plurality of units into which an access unit is divided, wherein in each of packets included in the first packet group, sequence number information is stored, the sequence number information indicating a sequence number for identifying an MPU to which access units stored in the packet belong, wherein in each of packets included in the second packet group, sequence number information is stored, the sequence number information indicating a sequence number for identifying an MPU to which access units stored in the packet belong, and wherein in a packet included in the first packet group and a packet included in the second packet group, a same value is stored as the sequence number information, the packets storing access units to be played back during a same playback period;

receiving a control information packet to be transmitted using the first transmission channel or the second transmission channel, the control information packet including time information used to derive decoding times of the access units;

deriving a decoding time for each of the access units using the time information; and when a video signal to be played back during a certain playback period is decoded, decoding access units used for the playback in order of the decoding times from among a plurality of access units transmitted by a packet of the first packet group and a packet of the second packet group, the packets having a same sequence number associated with the playback period.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 9 is a diagram showing an example of operating modes of a rearranger according to the first exemplary embodiment;

FIG. 23 is a diagram showing a configuration of multiplexed data;

FIG. 29 is a diagram showing an internal configuration of stream attribute information;

FIG. 30 is a diagram showing steps for identifying video data;

FIG. 31 is a block diagram showing an example of a configuration of an integrated circuit that implements a method for encoding a moving image and a method for decoding a moving image of each exemplary embodiment;

FIG. 34 is a diagram showing an example of a lookup table where standards of video data and drive frequencies are associated with each other;

Figure 1:
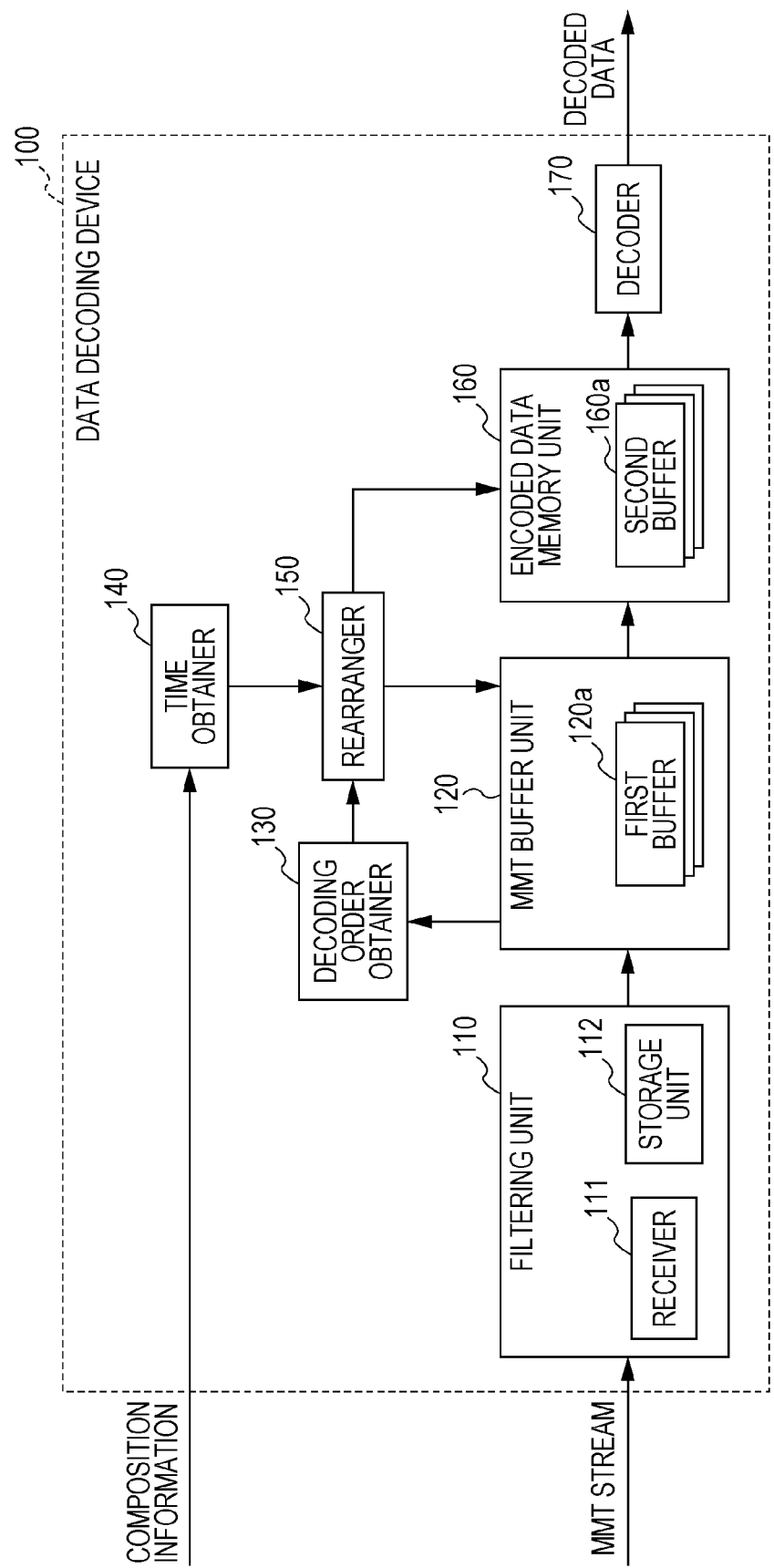
FIG. 1 is a block diagram showing an example of a configuration of a data decoding device according to a first exemplary embodiment.

DETAILED DESCRIPTION (Findings Forming a Basis of the Present Disclosure)

The present inventors have found that a following problem occurs with, for example, a conventional method for decoding data described in the "BACKGROUND ART" section.

In MMT, there is specified a format of data forming an MMT package or a packetization method used upon data transmission, and data of a plurality of assets forming an MMT package can be multiplexed and transmitted. Specifically, data of a plurality of assets is multiplexed, thereby generating a plurality of different streams. The streams are transmitted on a packet basis, using a plurality of respective transmission channels.

However, a system decoder model is not specified for MMT. Hence, it cannot be guaranteed that, for example, when MMT data is received and decoded, data of an access unit included in encoded data is available at a decoding time of the access unit.

Note that the system decoder model is, for example, a model for guaranteeing that by a receiving device including a buffer of a predetermined size, the receiving device decodes each of a plurality of access units included in received encoded data at a decoding time of the access unit, without causing a buffer overflow or underflow. Note that an MPEG-2 system has a System Target Decoder (STD) model.

In MMT, since a plurality of streams can be transmitted on a packet basis, using a plurality of transmission channels, received packets are not always in a decoding order. Depending on a configuration of each stream or a configuration of a transmission channel, a later packet in the decoding order may be received first. In this case, the packet received first needs to be held in a buffer until the packet is ready for decoding, which may cause a buffer overflow.

On the other hand, depending on a configuration of each stream or a configuration of a transmission channel, it may require a long time to receive a packet to be decoded next. This case may cause a buffer underflow.

As such, in the conventional technique, there is a problem that it cannot be guaranteed that encoded data is decoded such that occurrence of a buffer overflow or underflow is reduced.

To solve the above-described problem, a method for decoding data according to one aspect of the present disclosure includes: a receiving step (S110) of receiving a plurality of encoded streams on a packet basis, the encoded streams being included in encoded data and having been transmitted using a plurality of respective transmission channels; a storing step (S120) of storing a plurality of packets of the received plurality of encoded streams, in a first buffer (120a); a rearranging step (S150) of rearranging the plurality of packets stored in the first buffer, in a decoding order; and a decoding step (S160) of decoding the plurality of packets rearranged in the decoding order.

With this configuration, even when packets are transmitted using a plurality of transmission channels, since a plurality of packets stored in the first buffer are rearranged in the decoding order and decoded, the packets can be appropriately decoded. For example, by rearranging packets in the decoding order, the packets can be decoded at appropriate timing, and thus, occurrence of a buffer overflow or underflow can be suppressed.

In addition, for example, each of the plurality of packets may be associated with one or more assets forming the encoded data, the assets may be associated with one or more respective first buffers, and in the storing step (S120), each of the plurality of packets may be allocated to a corresponding asset and stored in a corresponding one of the first buffers.

With this configuration, since the one or more first buffers are associated with the respective assets, pieces of data of one asset are stored in one first buffer. Hence, buffer management can be easily performed, and accordingly, a speed of a packet rearrangement process, etc., can be increased and thus delay can be reduced. In addition, by the increase in the speed of the process, occurrence of a buffer overflow can be reduced.

In addition, for example, each of the plurality of packets may include a packet identifier (packet_id) indicating an asset associated with the packet, and in the storing step (S120), the packet may be allocated by obtaining the packet identifier from the packet.

With this configuration, only by determining a packet identifier, an asset and a first buffer with which a packet is associated can be identified. Therefore, an allocation process can be easily performed, and accordingly, a speed of the process can be increased and thus delay can be reduced.

In addition, for example, in the rearranging step (S150), one of a plurality of modes relating to timing of reading each of the packets from the first buffer may be further selected, and the packet may be read from the first buffer according to the selected mode and stored in a second buffer, and in the decoding step (S160), the packet stored in the second buffer may be decoded.

With this configuration, since one mode is selected from a plurality of modes, packets can be decoded based on a mode that can further reduce delay, for example.

In addition, for example, the plurality of modes may include: a first mode (MPU mode) in which, after each of the packets is stored in the first buffer, the packet can be read from the first buffer; a second mode (fragment mode) in which, after a target unit of division is stored in the first buffer, the target unit of division can be read from the first buffer, the target unit of division being one of a plurality of units of division forming each of the packets; and a third mode (media unit mode) in which, before storing of the target unit of division of the packet in the first buffer is completed, a part of the target unit of division can be read from the first buffer.

With this configuration, for example, when the second mode or the third mode is selected, data can be read before storing of a packet is completed, and thus, a speed of a process can be increased. In addition, occurrence of a buffer overflow can be suppressed.

In addition, for example, the plurality of units of division may be access units or NAL units.

With this configuration, since decoding is performed on an access unit or NAL unit basis, processing standby time, etc., can be reduced, enabling to increase a speed of a process.

In addition, for example, in the rearranging step (S150), a mode flag indicating a mode to be selected may be obtained from the encoded data, and the mode to be selected may be selected based on the obtained mode flag.

With this configuration, by setting a mode flag upon transmitting, a receiver side can decode packets in a mode assumed upon transmitting.

In addition, for example, the method for decoding data may further include: a time obtaining step (S142) of obtaining first time information for determining a decoding time of each of the plurality of packets; and a time calculating step (S143) of calculating second time information based on the first time information, the second time information indicating a decoding time of each of a plurality of units of division forming the packet, and in the rearranging step (S150), the packet may be stored in a second buffer on a unit-of-division basis by referring to the second time information.

With this configuration, since reading of data from the first buffer is performed based on a decoding time, each unit of division (e.g., an access unit) can be decoded according to a decoding time.

In addition, for example, each of the plurality of packets may be transmitted using any one of the plurality of transmission channels, and the packets in the transmission channels may be transmitted in a decoding order.

With this configuration, encoded streams can be decoded individually. For example, only a first encoded stream transmitted using a first transmission channel can be decoded and played.

In addition, for example, the packets may be MPUs (Media Processing Units).

With this configuration, a process that complies with an MMT standard can be performed.

In addition, for example, the plurality of transmission channels may include broadcasting and communication.

With this configuration, encoded data can be transmitted by using two physically different media: broadcasting and communication.

In addition, a data decoding device according to one aspect of the present disclosure includes: a receiver (110) that receives a plurality of encoded streams on a packet basis, the encoded streams being included in encoded data and having been transmitted using a plurality of respective transmission channels; a buffer (120) that stores a plurality of packets of the plurality of encoded streams received by the receiver; a rearranger (150) that rearranges the plurality of packets stored in the buffer, in decoding order; and a decoder (170) that decodes the plurality of packets rearranged by the rearranger.

With this configuration, as with the above-described method for decoding data, even when packets are transmitted using a plurality of transmission channels, since a plurality of packets stored in a buffer are rearranged in the decoding order and decoded, the packets can be appropriately decoded. For example, by rearranging packets in the decoding order, the packets can be decoded at appropriate timing, and thus, occurrence of a buffer overflow or underflow can be suppressed.

In addition, a method for transmitting data according to one aspect of the present disclosure includes: a step (S220) of generating a flag indicating whether rearrangement of a plurality of packets is required, the plurality of packets forming a plurality of encoded streams included in encoded data; and a step (S240) of transmitting, using each of a plurality of transmission channels, a corresponding one of the encoded streams on a packet basis, and transmitting the flag using at least one of the plurality of transmission channels.

With this configuration, a decoder side can determine whether rearrangement is required, by determining a flag. Thus, for example, workload can be reduced when rearrangement is not required.

In the following, exemplary embodiments will be specifically described with reference to the drawings.

Note that all of the exemplary embodiments described below provide comprehensive or specific examples. Numerical values, shapes, materials, components, disposition positions and connection modes of the components, steps, order of steps, and the like, which are shown in the following exemplary embodiments are examples and thus are not intended to limit the present disclosure. In addition, of components of the following exemplary embodiments, components that are not described in independent claims representing the broadest concept are described as optional components.

First Exemplary Embodiment

[Data Decoding Device]

First, a summary of a data decoding device (system decoder) according to the present exemplary embodiment will be described with reference to FIG. 1. FIG. 1 is a block diagram showing a configuration of data decoding device 100 according to the present exemplary embodiment.

Data decoding device 100 according to the present exemplary embodiment decodes encoded data including a plurality of encoded streams which have been transmitted using a plurality of transmission channels. As shown in FIG. 1, data decoding device 100 includes filtering unit 110, MMT buffer unit 120, decoding order obtainer 130, time obtainer 140, rearranger 150, encoded data memory unit 160, and decoder 170.

Filtering unit 110 receives encoded streams on a packet basis, and filters the received packets. Specifically, filtering unit 110 allocates the received packets asset-by-asset. Filtering unit 110 includes receiver 111 and storage unit 112.

Receiver 111 receives a plurality of encoded streams on a packet basis. The plurality of encoded streams are included in encoded data and have been transmitted using a plurality of respective transmission channels. That is, receiver 111 receives, from each of the plurality of transmission channels, a corresponding encoded stream on a packet basis. The plurality of encoded streams included in the encoded data have a one-to-one correspondence with the plurality of transmission channels, and are transmitted on a packet basis using corresponding transmission channels. For example, each of the encoded streams is an independently decodable stream and is specifically an MMT stream formed of a plurality of MMT packets.

Note that each of the plurality of packets is associated with one or more assets forming the encoded data. For example, each of the plurality of packets includes a packet identifier (packet_id) indicating an asset associated with the packet.

Note that the asset is a data entity including data of the same transport characteristics and is, for example, any one of video data, audio data, and the like. Specifically, the asset corresponds to an encoded stream of AV data. For example, when video data is hierarchically encoded, streams at respective hierarchical levels correspond to different assets. Details of the MMT packets, the MMT streams, the assets, and the packet identifiers will be described later with reference to FIG. 2.

Storage unit 112 stores the plurality of packets of the received plurality of encoded streams, in first buffers 120a. Note that a number of first buffers 120a is one or more, and one asset is associated with each of one or more first buffers 120a.

Storage unit 112 allocates each of the plurality of packets to a corresponding asset, and stores the packet in corresponding first buffer 120a. For example, storage unit 112 allocates a packet by obtaining a packet identifier from the packet.

MMT buffer unit 120 includes one or more first buffers 120a. Specifically, one or more assets are associated with one or more first buffers 120a in a one-to-one manner. For example, MMT buffer unit 120 includes first buffers 120a of the same number as a number of the plurality of assets forming the encoded streams. For example, when the encoded streams include video data and audio data, MMT buffer unit 120 includes two first buffers 120a including a buffer for storing the video data and a buffer for storing the audio data.

First buffer 120a is an MMT packet input buffer. In first buffer 120a, payload data of an MMT packet is rearranged in a decoding order. Specifically, access unit data is rearranged in the decoding order. Then, the rearranged access unit data is stored in the decoding order in corresponding second buffer 160a, according to predetermined timing.

Decoding order obtainer 130 obtains, from each of the plurality of packets, information indicating a position of the packet in the decoding order. For example, decoding order obtainer 130 obtains the decoding order of a payload by analyzing header information of a packet. Specifically, decoding order obtainer 130 obtains the decoding order of access units included in a payload or the decoding order of units into which an access unit is divided (e.g., NAL units).

Time obtainer 140 obtains first time information for determining a decoding time (DTS: Decode Time Stamp) or a presentation time (PTS: Presentation Time Stamp) of each of the plurality of packets. Specifically, time obtainer 140 obtains first time information by obtaining and analyzing composition information (CI: Composition Information) included in a header portion of an MMT stream. The first time information is, for example, an absolute value of a DTS or a PTS of a first access unit included in a packet.

Rearranger 150 rearranges the plurality of packets stored in first buffers 120a in a decoding order. For example, rearranger 150 rearranges a plurality of packets in the decoding order in a memory area of first buffer 120a. Alternatively, rearranger 150 may rearrange a plurality of packets in the decoding order by allowing first buffer 120a to output the packets in the decoding order.

In addition, for example, rearranger 150 selects one of a plurality of modes relating to timing of reading packets from first buffers 120a, reads the packets from first buffers 120a according to the selected mode, and stores the packets in second buffers 160a. Specifically, rearranger 150 obtains a mode flag indicating a mode to be selected from the encoded data and selects the mode to be selected based on the obtained mode flag.

Note that the plurality of modes include, for example, an MPU mode, a fragment mode, and a media unit mode. Details of the plurality of modes will be described later with reference to FIG. 9.

In addition, rearranger 150 calculates second time information indicating a decoding time of each of units of division forming a packet, based on, for example, the first time information. Rearranger 150 stores the packet in second buffer 160a on a unit-of-division basis by referring to the second time information. Note that the units of division are, for example, access units or NAL units.

Encoded data memory unit 160 includes one or more second buffers 160a. Specifically, one or more assets are associated with one or more second buffers 160a in a one-to-one manner. For example, encoded data memory unit 160 includes second buffers 160a of the same number as a number of the plurality of assets forming the encoded streams.

Decoder 170 decodes the plurality of packets which are rearranged in a decoding order. For example, decoder 170 decodes the packets stored in encoded data memory unit 160. Specifically, decoder 170 decodes the packets on an access unit or NAL unit basis, based on a moving image coding standard such as HEVC. Decoded data (video data, audio data, or the like) generated by the decoding is output, for example, to a display or a speaker.

[Data Structure of an MMT Stream]

Figure 2:
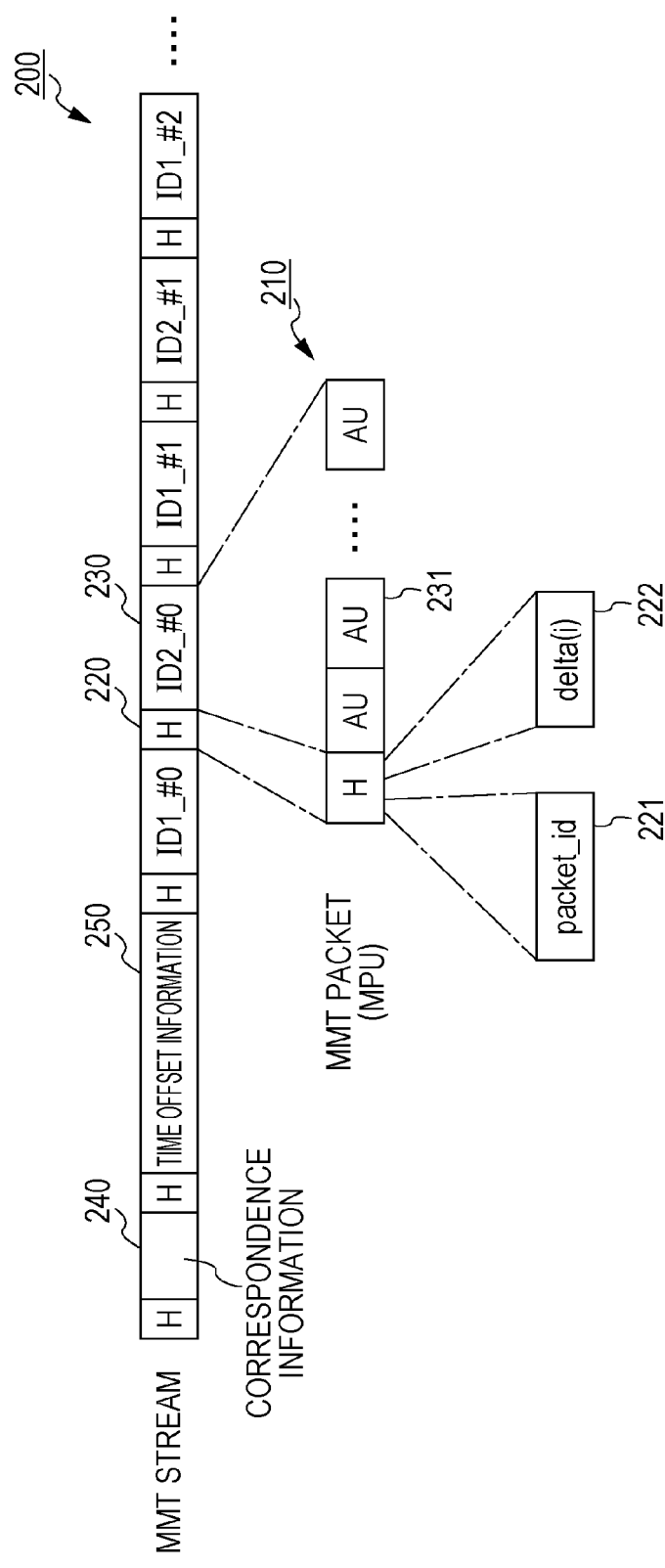
FIG. 2 is a diagram showing an example of a data structure of an MMT stream according to the first exemplary embodiment.

Next, a data structure of an MMT stream according to the present exemplary embodiment will be described with reference to FIG. 2. FIG. 2 is a diagram showing a data structure of MMT stream 200 according to the present exemplary embodiment.

MMT stream 200 is one of one or more streams forming one MMT package. The MMT package corresponds to one piece of encoded data. For example, the MMT package corresponds to one piece of broadcast program content. One MMT package is divided into a plurality of MMT streams 200, and the plurality of MMT streams 200 are transmitted using a plurality of transmission channels.

The encoded data is, for example, AV data which is encoded based on a moving image coding standard such as HEVC. Specifically, the encoded data includes video data, audio data, and metadata, still images, files, and the like, which are associated with the video data and the audio data.

The encoded data is converted into MP4 data according to a file format of MP4 which is one of system multiplexing standards. Then, by packetizing the MP4 data, MMT packets are generated. By multiplexing the plurality of MMT packets, MMT stream 200 is generated. Note that the MP4 data does not necessarily need to be a complete format and only needs to include at least data of samples which are units of storage of encoded data in MP4.

As shown in FIG. 2, MMT stream 200 includes a plurality of MMT packets 210. In other words, MMT stream 200 is a packet sequence of a plurality of MMT packets 210.

MMT packet 210 is data where one or more MPUs (Media Processing Units) are packetized. In the present exemplary embodiment, one MPU or units into which an MPU is divided form(s) one MMT packet 210. Note that the MPU is a unit of data defined in an MMT standard and is, for example, MP4 data.

MMT packet 210 is associated with one or more assets that form encoded data. The asset is, for example, video data, audio data, or metadata.

As shown in FIG. 2, MMT packet 210 includes header 220 and payload 230. In addition, payload 230 includes one or more access units 231.

The header 220 is attached information about payload 230. For example, header 220 includes packet identifier 221 and time information 222.

Packet identifier 221 is an identification number (packet_id) indicating an asset with which the packet is associated among one or more assets forming the encoded data. Specifically, packet identifier 221 indicates an asset with which payload 230 is associated. For example, in FIG. 2, packet identifier 221 is represented by "ID1" and "ID2". Note that packet_id is identification information unique to each asset forming the MMT package.

Time information 222 is time information for determining presentation times (PTSs) or decoding times (DTSs) of access units 231. For example, time information 222 is a relative value of a PTS or a DTS to a predetermined time. A specific method for determining a PTS or a DTS of access unit 231 using time information 222 will be described later.

Payload 230 includes one or more access units 231 included in a corresponding asset among one or more assets. Access unit 231 includes, for example, one or more NAL units.

For example, payload 230 includes a plurality of access units 231 included in one GOP (Group Of Pictures). Alternatively, payload 230 may include only one NAL unit or units into which a NAL unit is divided.

In addition, as shown in FIG. 2, MMT stream 200 includes, as service information, correspondence information 240 and time offset information 250.

Correspondence information 240 includes, for example, information indicating a correspondence relationship between a plurality of transmission channels, such as broadcasting and communication, and a plurality of packages (e.g., MPT (MMT Package Table)). In addition, correspondence information 240 includes information indicating a correspondence relationship between a plurality of assets, such as video data and audio data, and identification numbers (packet_id).

Time offset information 250 is time information for determining PTSs or DTSs of access units 231. For example, time offset information 250 indicates an absolute PTS or DTS of a predetermined access unit.

[Data Structure of the MPU]

Figure 3:
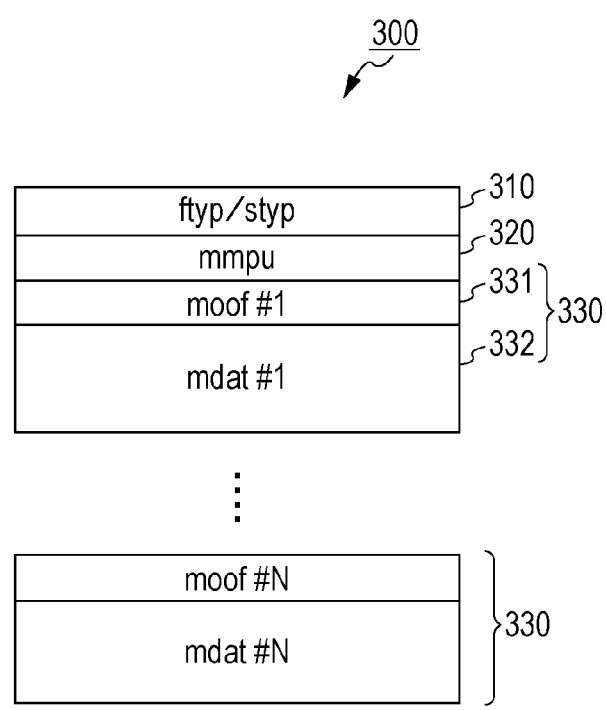
FIG. 3 is a diagram showing an example of a data structure of an MPU according to the first exemplary embodiment.

Next, an MPU according to the present exemplary embodiment will be described. FIG. 3 is a diagram showing a data structure of an MPU according to the present exemplary embodiment. Note that, as described above, in the present exemplary embodiment, one MPU forms one MMT packet.

As shown in FIG. 3, MPU 300 is formed of a plurality of boxes. Specifically, MPU 300 includes ftyp/styp box 310, mmpu box 320, and N box sets 330 (N is an integer greater than or equal to 1). Each of N box sets 330 includes moof box 331 and mdat box 332.

ftyp/styp box 310 includes, for example, information indicating a file type of MPU 300.

mmpu box 320 includes a sequence number, packet_id, and the like, of MPU 300.

moof box 331 includes MP4 header information. For example, moof box 331 includes time information such as a presentation time or a decoding time of a sample, etc., included in mdat box 332. moof box 331 includes a traf box, a tfdt box, and the like, which are not shown.

mdat box 332 includes content data such as video and audio. For example, mdat box 332 includes a sample or a subsample, specifically, an access unit, a NAL unit, or the like.

[Data Flow of MMT Packets]

Figure 4:
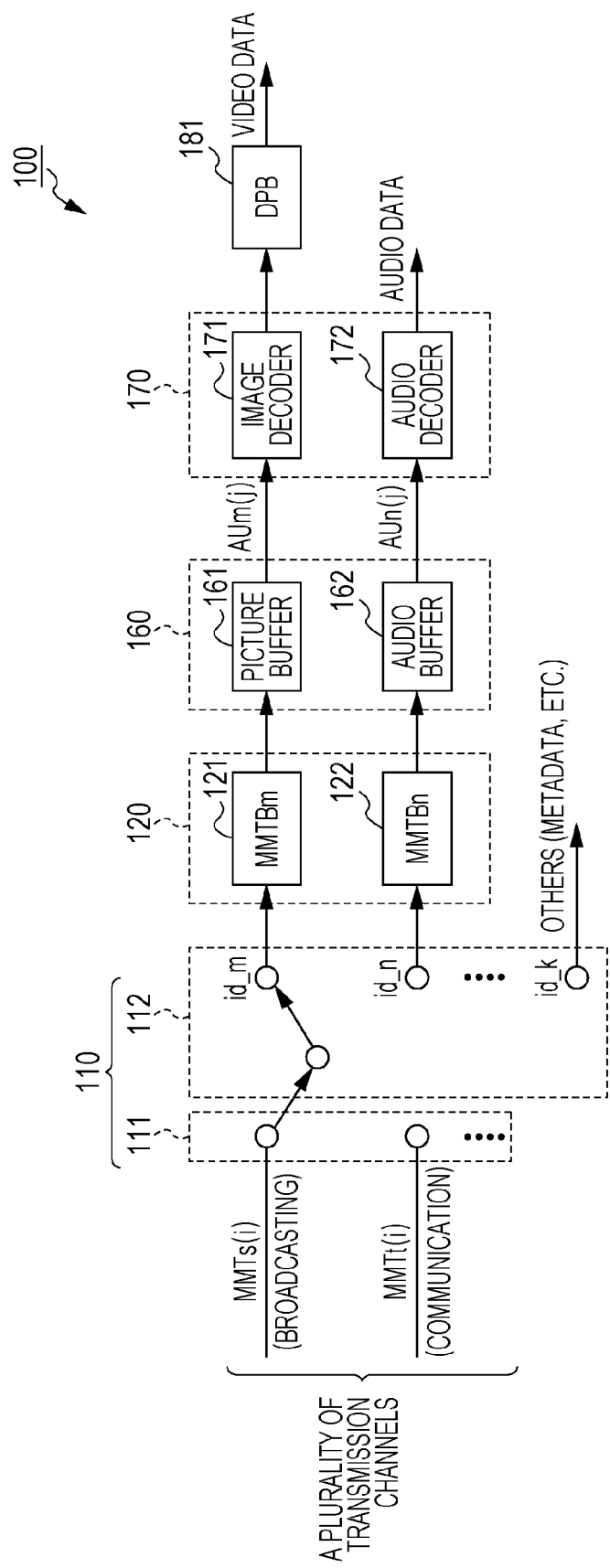
FIG. 4 is a diagram showing an example of a flow of MMT packet data according to the first exemplary embodiment.

Next, a data flow of MMT packets for a case of transmitting one MMT package using a plurality of transmission channels will be described with reference to FIG. 4. FIG. 4 is a diagram showing an example of a flow of MMT packet data according to the present exemplary embodiment.

The plurality of transmission channels are physically different transmission channels. Specifically, the plurality of transmission channels are connected to interfaces included in data decoding device 100, e.g., interfaces such as different connectors or different connection ports. The plurality of transmission channels include, for example, broadcasting and communication. The broadcasting includes terrestrial broadcasting, satellite broadcasting, CATV, and the like. The communication includes wireless communication such as the Internet and wired communication such as optical fiber communication.

For example, in the present exemplary embodiment, one piece of television program content is transmitted using two transmission channels: terrestrial broadcasting and Internet communication. For example, 60-fps data of a basic layer is transmitted through the terrestrial broadcasting, and 60-fps data of an extended layer is transmitted through the Internet communication.

At this time, when a receiver side receives only the data through the terrestrial broadcasting, the receiver side can play the television program content at a frame rate of 60 fps. In addition, when the receiver side receives both of the data through the terrestrial broadcasting and the data through the Internet communication, the receiver side can play the television program content at a frame rate of 120 fps, i.e., with higher definition.

For example, in the example shown in FIG. 4, an sth transmission channel is broadcasting and a tth transmission channel is communication. FIG. 4 shows a data flow for a case in which an ith MMT packet in an sth MMT stream (MMTs(i)) has arrived.

Filtering unit 110 filters MMT streams on an MMT packet basis, based on packet_id. Specifically, in filtering unit 110, when receiver 111 receives an MMT packet, receiver 111 obtains packet_id from a header of the MMT packet. Then, storage unit 112 allocates the MMT packet to a corresponding asset, based on the obtained packet_id. For example, when the packet_id of the received MMT packet is "m", storage unit 112 stores the MMT packet in MMTBm 121.

Note that, in FIG. 4, MMTBm 121 is a first buffer provided for an asset with the packet_id "m". In addition, MMTBn 122 is a first buffer provided for an asset with the packet_id "n". Each of MMTBm 121 and MMTBn 122 is a buffer for storing MMT payload data, and is an example of one or more first buffers 120*a* (MMTBs) included in MMT buffer unit 120 shown in FIG. 1.

Here, "m", "n", and "k" indicate mth, nth, and kth assets, respectively. Specifically, "m" indicates video data, "n" indicates audio data, and "k" indicates other data such as metadata. The other data also includes, for example, composition information.

A plurality of MMT packets stored in MMTBm 121 or MMTBn 122 are rearranged in a decoding order, and the rearranged MMT packets are output to picture buffer 161 or audio buffer 162. Each of picture buffer 161 and audio buffer 162 is an example of second buffer 160*a* shown in FIG. 1.

Picture buffer 161 is a buffer for storing video streams (EB: Elementary stream Buffer). For example, picture buffer 161 is CPB (Coded Picture Buffer) in MPEG-4 AVC or HEVC. Alternatively, picture buffer 161 is a VBV (Video Buffer Verifier) buffer in MPEG-2 Video.

Audio buffer 162 is a buffer for storing audio streams.

A plurality of access units forming the same asset are input to picture buffer 161 in a decoding order, and are output from picture buffer 161 in the decoding order. Specifically, a plurality of access units forming the same video data are input to picture buffer 161 in the decoding order, and are output from picture buffer 161 in the decoding order. For example, picture buffer 161 outputs stored access units to image decoder 171, based on DTSs. FIG. 4 shows an example of outputting a jth access unit associated with the mth asset AUm(j). The same also applies to audio buffer 162.

Image decoder 171 decodes the access units which are input from picture buffer 161. For example, image decoder 171 decodes the access units based on a moving image coding standard such as HEVC, and stores the decoded video data in reference buffer 181. In addition, image decoder 171 outputs video data which is decoded based on a PTS.

Here, reference buffer 181 is a buffer for saving reference pictures, i.e., decoded pictures, of video data. For example, reference buffer 181 is DPB (Decoded Picture Buffer) in MPEG-4 AVC or HEVC. Alternatively, reference buffer 181 is a re-order buffer in MPEG-2 Video.

Audio decoder 172 decodes access units which are input from audio buffer 162. For example, audio decoder 172 decodes the access units based on an audio coding standard such as MPEG-2 AAC or MPEG-4 AAC, and outputs the decoded audio data in synchronization with the video data.

Note that each of image decoder 171 and audio decoder 172 is included in decoder 170 shown in FIG. 1.

As described above, when an MMT packet associated with the mth asset, specifically, video data, is input, the MMT packet passes through MMTBm 121, picture buffer 161, image decoder 171, and reference buffer 181 in turn, and is output as video data. In addition, when an MMT packet associated with the nth asset, specifically, audio data, is input, the MMT packet passes through MMTBn 122, audio buffer 162, and audio decoder 172 in turn, and is output as audio data. In addition, when an MMT packet associated with the kth asset, specifically, metadata, etc., is input, a necessary process is performed on the MMT packet.

[Filtering and Rearrangement of MMT Packets]

Figure 5:
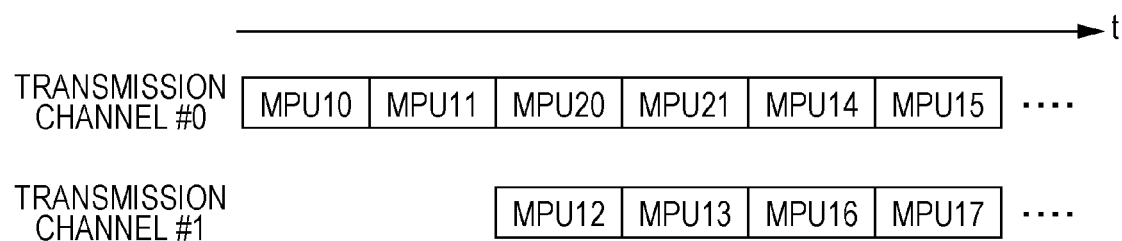
FIG. 5 is a diagram showing an example of MMT streams which are transmitted using a plurality of respective transmission channels according to the first exemplary embodiment.
Figure 6:
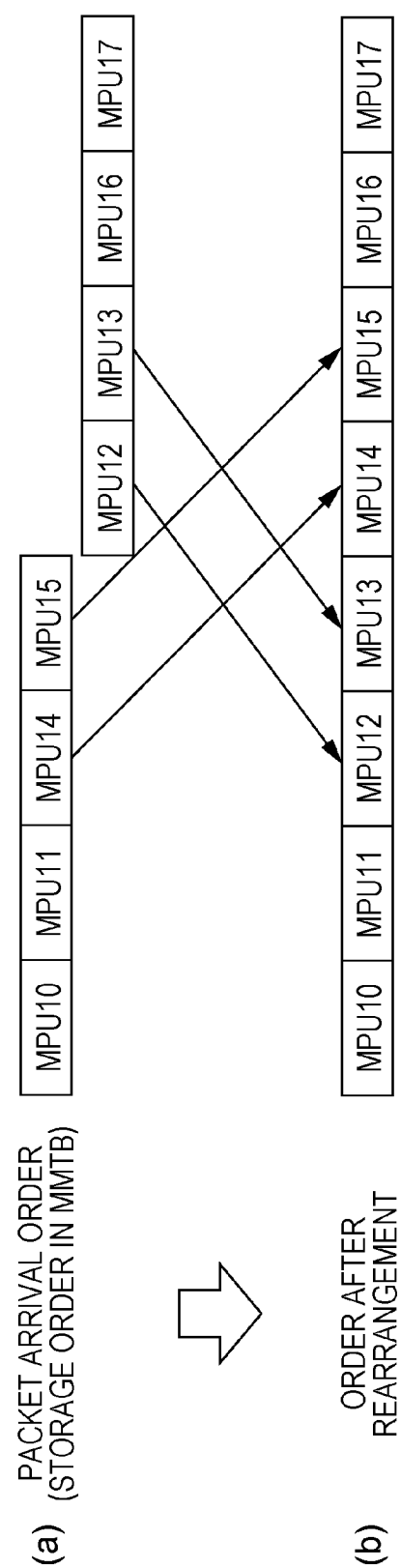
FIG. 6 is a diagram showing an example of a state of rearranging a plurality of MMT packets according to the first exemplary embodiment.

Next, a specific example of rearrangement of MMT packets according to the present exemplary embodiment will be described with reference to FIGS. 5 and 6. FIG. 5 is a diagram showing an example of MMT streams which are transmitted through a plurality of respective transmission channels according to the present exemplary embodiment. FIG. 6 is a diagram showing an example of a state of rearranging a plurality of MMT packets according to the present exemplary embodiment.

Note that in FIGS. 5 and 6 "x" in "MPUxy" indicates packet_id and "y" indicates an MPU sequence number for the same asset. For example, "MPU10" indicates an MPU with the packet_id "1" and the sequence number "0". An ascending order of the sequence numbers corresponds to a decoding order.

As shown in FIG. 5, an MMT stream including MMT packets of a plurality of assets is transmitted using transmission channel #0. Specifically, the MMT stream transmitted using transmission channel #0 includes MMT packets with the packet_id "1" (MPU10, etc.) and MMT packets with the packet_id "2" (MPU20, etc.). In addition, an MMT stream transmitted using transmission channel #1 includes MMT packets with the packet_id "1" (MPU12, etc.).

A plurality of MMT packets forming an MMT package are sent using any one of a plurality of transmission channels. In other words, in the present exemplary embodiment, an MMT packet is transmitted using only one of a plurality of transmission channels and is not transmitted using two or more transmission channels. In the example shown in FIG. 5, for example, MPU10 is transmitted using only transmission channel #0 and is not transmitted using transmission channel #1 or any other transmission channel.

In addition, packets in a transmission channel are transmitted in a decoding order. For example, in a transmission channel, MMT packets are transmitted in ascending order of the sequence numbers for each packet_id. Specifically, taking a look at MMT packets with the packet_id "1" shown in FIG. 5, the packets are arranged in order of MPU10, MPU11, MPU14, and MPU15 and transmitted in ascending order of the sequence numbers.

Therefore, an MMT stream transmitted using a transmission channel can be decoded independently of other MMT streams transmitted using other transmission channels.

Filtering unit 110 filters, for example, only packets with the packet_id "1". With this configuration, as shown in (a) of FIG. 6, only the packets with the packet_id "1" are stored in an MMTB in arrival order.

Here, as shown in FIG. 5, MMT packets forming the same asset, i.e., MMT packets with the same packet_id, are transmitted using a plurality of different transmission channels. Therefore, even if MMT packets are of the same asset, an arrival order of the MMT packets at the system decoder does not always match a decoding order. For example, as shown in (a) of FIG. 6, MPU14 with a large sequence number arrives earlier than MPU14 with a small sequence number.

Hence, rearrangement, i.e., reordering, of the MMT packets is required. Thus, as shown in (b) of FIG. 6, rearranger 150 rearranges the MMT packets in the decoding order, i.e., in ascending order of the sequence numbers.

Note that what is actually stored in the MMTB is not an MPU itself, but access unit data which is separated from the MPU.

[Operation of the Data Decoding Device]

Figure 7:
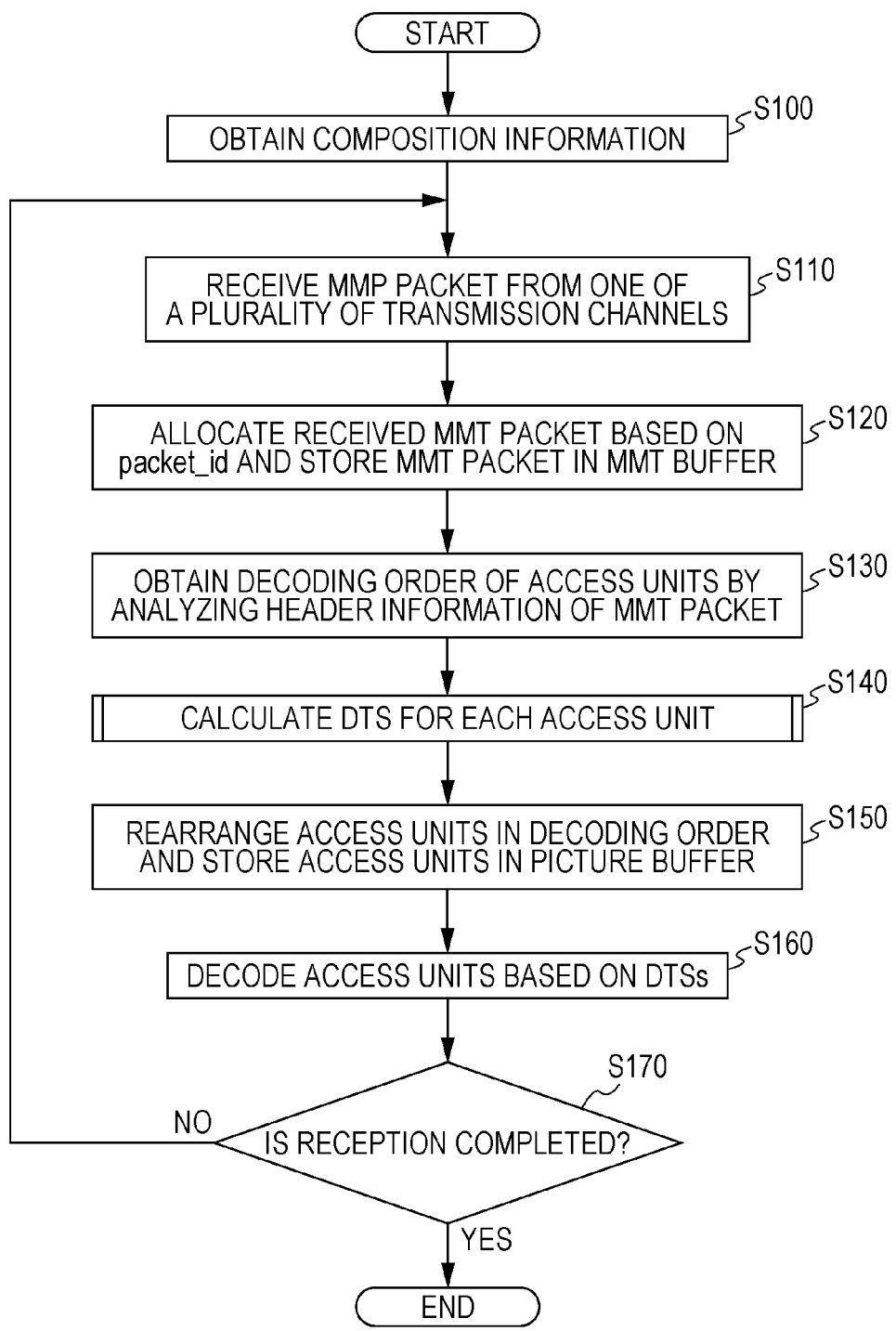
FIG. 7 is a flowchart showing an example of operation of the data decoding device according to the first exemplary embodiment.

Next, an example of operation of data decoding device 100 (system decoder) according to the present exemplary embodiment will be described with reference to FIG. 7. FIG. 7 is a flowchart showing an example of operation of data decoding device 100 according to the present exemplary embodiment.

Note that, in data decoding device 100 according to the present exemplary embodiment, an MMT reference clock is NTP (Network Time Protocol), and a DTS and a PTS are also set based on NTP. Note, however, that NTP does not need to be a value obtained from an NTP server and, for example, a value that is uniquely set by a broadcast station may be used alternatively.

First, data decoding device 100 according to the present exemplary embodiment obtains composition information (S100). Specifically, data decoding device 100 obtains and analyzes composition information of a plurality of transmission channels through which an MMT package is to be transmitted, and thereby obtains, as composition information, for example, information required for reception from each transmission channel and information indicating a correspondence relationship between assets and packet identifiers. For example, the information required for reception is a network ID in a case of broadcasting, and is a URL (Uniform Resource Locator) in a case of communication.

The composition information is included in, for example, headers at beginning of a plurality of MMT streams. Specifically, the composition information is, for example, correspondence information 240 and time offset information 250 shown in FIG. 2. For example, in FIG. 1, time obtainer 140 obtains time offset information 250 included in composition information. After the composition information is received, reception of MMT assets starts.

Then, receiver 111 receives an MMT packet through one of the plurality of transmission channels (S110). Specifically, receiver 111 obtains an MMT packet to be transmitted using each of the plurality of transmission channels, in arrival order.

Then, storage unit 112 allocates the received MMT packet based on packet_id, and stores the MMT packet in an MMTB (S120). In other words, storage unit 112 filters the MMT packet and thereby sorts the MMT packet asset-by-asset, and stores the MMT packet in an MMTB provided for the sorted asset.

Then, decoding order obtainer 130 obtains a decoding order of access units by analyzing header information of the MMT packet (S130). Specifically, decoding order obtainer 130 determines the MPU decoding order, based on a parameter indicating an MPU sequence number stored in a header of the MMT packet. Alternatively, decoding order obtainer 130 may obtain the decoding order of units (subsamples) into which an access unit is divided.

Then, rearranger 150 calculates a DTS for each access unit (S140). Note that, when the access units are decoded on a subsample basis, rearranger 150 calculates a DTS for each subsample. A specific example of a method for calculating a DTS will be described later with reference to FIG. 8.

Then, rearranger 150 rearranges payload data of the received MMT packet in a decoding order, separates the payload data access-unit-by-access-unit, and stores the data in second buffer 160a (e.g., a picture buffer) (S150). At this time, timing of reading (extracting) an access unit from first buffer 120a (MMTB) to second buffer 160a is defined by one of a plurality of predefined modes (selected mode).

Then, decoder 170 decodes the access units based on the DTSs (S160). Specifically, encoded data memory unit 160 extracts, based on the DTSs of the access units, a target access unit from second buffer 160a and outputs the target access unit to decoder 170. For example, encoded data memory unit 160 extracts an access unit or a subsample from second buffer 160a according to decoding times of access units or subsamples which are calculated by rearranger 150, and outputs the access unit or subsample to decoder 170. Then, decoder 170 decodes the input target access unit.

Note that whether to decode an access unit on a subsample basis may be set by data decoding device 100, or may be set by MMT composition information or information included in an MMT message.

If a new MMT packet is not input (Yes at S170), data decoding device 100 ends the decoding process. If reception of a packet is not completed (No at S170), processes starting from reception of a packet (S110) are repeated.

[Method for Determining a PTS and a DTS]

Next, an example of a method for determining a PTS (presentation time) and a DTS (decoding time) of an access unit (S140 in FIG. 7) will be described.

PTSm(i) which is a presentation time of an ith access unit in display order in an mth MPU (MMT packet) is calculated using a following (Equation 1).

$$\text{PTS}m(i) = \text{PTS}m(0) + \text{deltaPTS}(i) \quad \text{(Equation 1)}$$

PTSm(0) is a presentation time of an access unit that is in a first position in display order in the mth MPU. In addition, deltaPTS(i) is a difference value between PTSm(i) and PTSm(0).

In addition, DTSm(i) which is a decoding time of an ith access unit in a decoding order in the mth MPU (MMT packet) is calculated using a following (Equation 2).

$$\text{DTS}m(i) = \text{DTS}m(0) + \text{deltaDTS}(i) \quad \text{(Equation 2)}$$

DTSm(0) is a decoding time of an access unit that is in a first position in the decoding order in the mth MPU. In addition, deltaDTS(i) is a difference value between DTSm(i) and DTSm(0).

Note that the presentation time PTSm(0) and decoding time DTSm(0) of the first access units are examples of first time information included in composition information (CI) which is obtained separately from video data, audio data, and the like. For example, PTSm(0) and DTSm(0) correspond to time offset information 250 shown in FIG. 2. In addition, deltaPTS(i) and deltaDTS(i) are obtained by analyzing a traf box included in a moof box which is MP4 header information. For example, deltaPTS(i) and deltaDTS (i) correspond to time information 222 shown in FIG. 2.

Figure 8:
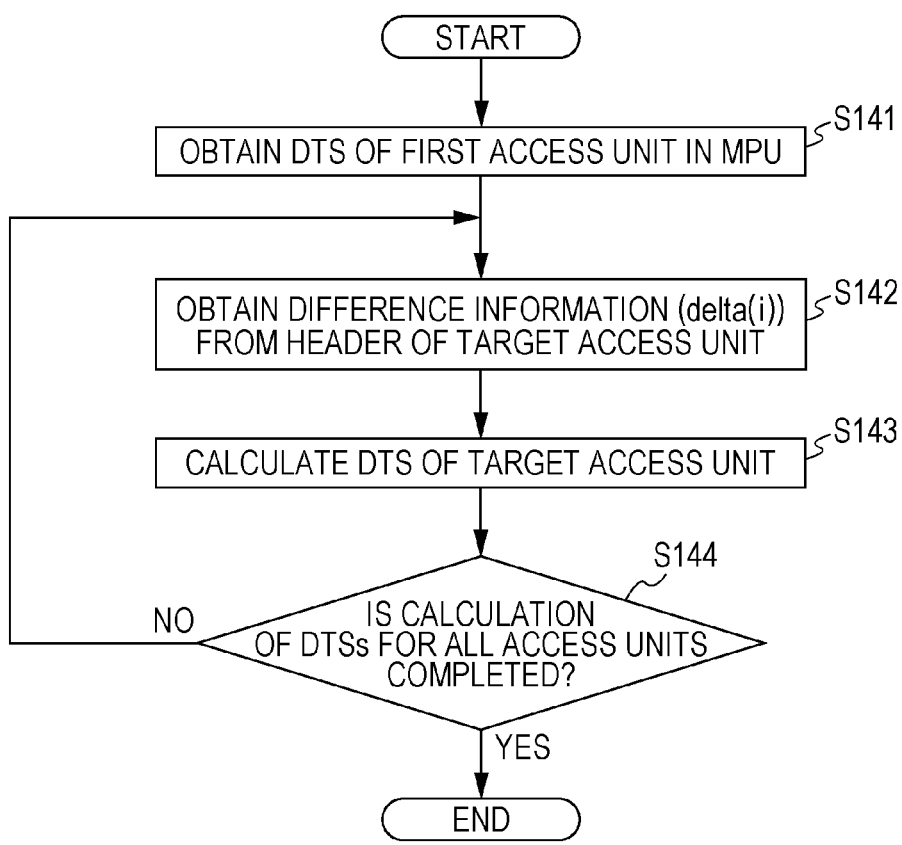
FIG. 8 is a flowchart showing an example of a method for determining a DTS in the data decoding device according to the first exemplary embodiment.

In the following, since a method for determining a PTS and a method for determining a DTS are substantially the same, the method for determining a DTS will be mainly described with reference to FIG. 8. FIG. 8 is a flowchart showing an example of a method for determining a DTS in the data decoding device according to the present exemplary embodiment.

To perform calculation using (Equation 2), as shown in FIG. 8, rearranger 150 obtains a DTS of an access unit that is in a first position in a decoding order in an MPU (S141). For example, rearranger 150 obtains DTSm(0) by obtaining first time information which is extracted by time obtainer 140 from composition information.

Then, rearranger 150 obtains difference information (deltaDTS(i)) from a header of a target access unit (S142). For example, rearranger 150 obtains difference information by analyzing a traf box in a moof box which is MP4 header information. Note that, when a moof box is not included in an MPU, a DTS or a PTS for each access unit may be determined based on header information of an MMT packet or an MMT payload, time information to be transmitted by an MMT message, or the like.

Then, rearranger 150 calculates a DTS of the target access unit (S143). Specifically, rearranger 150 adds the obtained DTSm(0) and deltaDTS(i) together, and thereby calculates DTSm(i) as shown in (Equation 2).

If calculation of DTSs for all access units is completed (Yes at S144), the DTS calculation process ends, and a process of storing the access units in second buffer 160a (S150) is performed. If calculation of all DTSs is not completed (No at S144), processes starting from a process of obtaining difference information (S142) are repeated.

Note that when an MMT payload is transmitted using RTP (Real-time Transport Protocol), etc., a PTS and a DTS for each access unit may be signaled in a header of an RTP packet. An MMT packet can also take the same packet structure as RTP, and thus, it is also possible to signal a PTS and a DTS for each access unit in a header of the MMT packet or as header information of an MMT payload. Likewise, when an MMT payload is transmitted using MPEG-2 TS, a PTS and a DTS for each access unit may be signaled in a header of a PES (Packetized Elementary Stream) packet. With this configuration, rearranger 150 can obtain a PTS and a DTS for each access unit by analyzing a header of an RTP packet or a header of a PES packet.

In addition, if a PTS of an access unit that is in a first position in display order in an MPU is known, then a difference between the PTS and DTS of the access unit may be obtained by analyzing a traf box in a moof box which is MPU header information, and then calculation may be performed based on PTSm(0).

In addition, there may be a case in which a DTS or a PTS of a first access unit in second and subsequent MPUs is not included in composition information, etc. In this case, rearranger 150 may calculate a DTS (or PTS) of an access unit that is a first one of units of division, based on information indicating an absolute value of difference time between a DTS (or PTS) of a sample which is a first one of a plurality of units of division forming an MPU and a DTS (or PTS) of a first sample of a first MPU. If a DTS is calculated, then a PTS can be obtained by analyzing information provided in a unit of division.

Note that here the units of division are, for example, track fragments which are units of fragments in MP4. In addition, as the information indicating an absolute value of difference time, an absolute value of difference time between a DTS of a first sample in an MPU that is a first one of MPUs of the same asset and a DTS of a first access unit in a track fragment where a tfdt box is stored is provided in the tfdt box.

[Operating Mode of the Rearranger]

Next, operating modes of rearranger 150 according to the present exemplary embodiment will be described with reference to FIG. 9. Specifically, modes relating to timing of reading data from first buffer 120a in MMT buffer unit 120 will be described. FIG. 9 is a diagram showing an example of operating modes of rearranger 150 according to the present exemplary embodiment.

Rearranger 150 according to the present exemplary embodiment can perform a process according to any one of three operating modes.

A first mode is a mode in which, after a packet is stored in first buffer 120a, the packet can be read from first buffer 120a. Specifically, the first mode is an MPU mode.

As shown in FIG. 9, when rearranger 150 performs a process according to the MPU mode, rearranger 150 waits until all data of an MPU becomes available, and then reads a target packet from the MMTB. For example, rearranger 150 reads a packet from the MMTB on an access unit basis, and stores the read access units in second buffer 160a.

A second mode is a mode in which, after a target unit of division which is one of a plurality of units of division forming a packet is stored in first buffer 120a, the packet can be read from first buffer 120a. Specifically, the second mode is a fragment mode.

As shown in FIG. 9, when rearranger 150 performs a process according to the fragment mode, rearranger 150 waits until all data of a fragment which is a unit of division of an MPU becomes available, and then reads a target fragment from the MMTB. Rearranger 150 stores the read fragment in second buffer 160a. Note that the fragment is a sample in MP4 (corresponding to an access unit) or a subsample which is a unit into which a sample is divided.

A third mode is a mode in which, before storing of a target unit of division of a packet in first buffer 120a is completed, a part of the target unit of division can be read from first buffer 120a. Specifically, the third mode is a media unit mode.

As shown in FIG. 9, when rearranger 150 performs a process according to the media unit mode, rearranger 150 reads a part of an MPU or a fragment from the MMTB without waiting until all data of the MPU or fragment becomes available. Rearranger 150 stores the read part of the MPU or fragment in second buffer 160a.

The data stored in second buffer 160a is output to decoder 170 on an access unit basis based on DTSs.

Note that, in each of the above-described modes, a NAL unit in MPEG-4 AVC or HEVC, a decoding unit in HEVC, or the like, may be output as a subsample to decoder 170 from second buffer 160a at a decoding time of the subsample.

At this time, in a case of a fixed frame rate, the decoding time of the subsample can be calculated by dividing a frame interval by a number of subsamples (or subsamples including slice data) included in an access unit or by a number of decoding units. Alternatively, in a case of a variable frame rate, the decoding time of the subsample may be determined based on additional information such as picture timing SEI.

In the present exemplary embodiment, rearranger 150 can adopt the above-described three modes independently of a unit of MMT packetization.

For example, even when the unit of packetization is an access unit, reading (extraction) of data from the MMTB can be continuously performed on a subsample basis or at a predetermined bit rate. Furthermore, when decoder 170 performs decoding on a subsample basis, extraction from second buffer 160a is also performed on a subsample basis.

Alternatively, even when the unit of packetization is an MPU, extraction of data from the MMTB can be performed on an access unit basis. Likewise, when the unit of packetization is a subsample, extraction of data from the MMTB can be performed on an access unit basis. The same also applies to a case in which packetization is performed using a protocol such as RTP or TS.

With this configuration, buffering time before starting decoding can be reduced on a decoder side, independently of the unit of packetization. In addition, when decoding is performed on a subsample basis, by using the fragment mode or the media unit mode, buffering time for received data can be reduced. By using the fragment mode or the media unit mode in this manner, a low-delay process is possible. Namely, a speed of a decoding process can be increased.

Note that in the present exemplary embodiment, when data of the same asset is transmitted using a single transmission channel, a MMT packet receiving order (arrival order or storage order) matches a MMT packet decoding order. Hence, rearranger 150 does not need to rearrange MMT packets. For example, a sender side may send a flag indicating whether rearrangement is required, which is included in composition information, an MMT message, or the like. With this configuration, when rearrangement is not required, rearranger 150 operates so as not to perform rearrangement.

For example, when data of the same asset is transmitted using a single broadcast channel, rearranger 150 does not need to rearrange MMT packets. Note, however, that even in a case of using only broadcasting as transmission channels, when data of the same asset is transmitted using a plurality of broadcast channels, rearranger 150 rearranges MMT packets in a decoding order.

On the other hand, even when data of the same asset is transmitted using a single transmission channel, in a communication channel in an IP network, etc., MMT packet receiving and decoding orders may not match each other. In this case, rearranger 150 rearranges MMT packets in the decoding order.

Note that in the present exemplary embodiment, to achieve consistency with the MPEG-2 TS system target decoder, rearranger 150 may select only the fragment mode or the media unit mode which allows processes on an access unit basis.

[Extraction Rate from a Buffer]

Next, an extraction rate and a size from/of first buffer 120a will be described.

For example, rearranger 150 can use two types of modes that specify an extraction rate from first buffer 120a.

A first mode is a leak model mode. In the leak model mode, an extraction rate of data from first buffer 120a to second buffer 160a is, for example, a value obtained by multiplying an upper limit value of a bit rate for a profile, a level, or the like, specified in an encoding scheme of video or audio stored in an MPU, by a coefficient. With this configuration, consistency with the MPEG-2 TS system target decoder can be maintained.

A second mode is a vbv_delay or HRD (Hypothetical Reference Decoder) model mode. In this mode, in a case of video data, extraction can be performed at a rate specified in a vbv_delay model in MPEG-2 video or in an HRD model in MPEG-4 AVC or HEVC.

Note that, when a buffer occupation amount of second buffer 160a is larger than a predetermined value, e.g., when the buffer occupation amount is 100%, rearranger 150 stops extraction. In addition, when a buffer occupation amount of first buffer 120a is smaller than a predetermined value, e.g., when the buffer occupation amount is empty (0%), rearranger 150 stops extraction.

One of the two types of modes to be used and an extraction rate can be provided in information that can be obtained before starting decoding MMT content, such as MMT message information. Alternatively, when an MMT packet is transmitted using TS, such a mode and an extraction rate can be provided in an MPEG-2 system descriptor.

[Buffer Size]

Next, a size of first buffer 120a will be described.

The size of first buffer 120a is, for example, a value obtained by multiplying an upper limit value of a size of an encoded picture buffer for a profile, a level, or the like, specified in an encoding scheme of video data or audio data which is stored in an MPU, by a coefficient. The coefficient is determined based on, for example, a proportion of header information (moof box) of an MPU to a sum total of access unit sizes of the MPU. Note that a size of first buffer 120a provided for audio data can also be separately defined according to a number of channels, etc.

The size of first buffer 120a can be provided in information that can be obtained before starting decoding MMT content, such as MMT message information. Alternatively, when an MMT packet is transmitted using TS, the size of first buffer 120a can be provided in an MPEG-2 system descriptor.

In addition, for the size of first buffer 120a, different buffer sizes may be set for the above-described three different operating modes (MPU mode, fragment mode, and media unit mode). Alternatively, for the size of first buffer 120a, different buffer sizes may be set depending on whether a unit of a decoding process is a unit of an access unit or a unit of a subsample. For example, when decoding is performed on a subsample basis, the size of first buffer 120a can be made smaller than that for when decoding is performed on an access unit basis.

Note that a third buffer may be provided between first buffer 120a and second buffer 160a. The third buffer is, for example, an MB (Multiplexing Buffer). In this case, rearranger 150 controls extraction of data from the third buffer to second buffer 160a. With this configuration, consistency with the MPEG-2 TS system target decoder can be maintained.

[Configuration of a Data Transmission Device]

Figure 10:
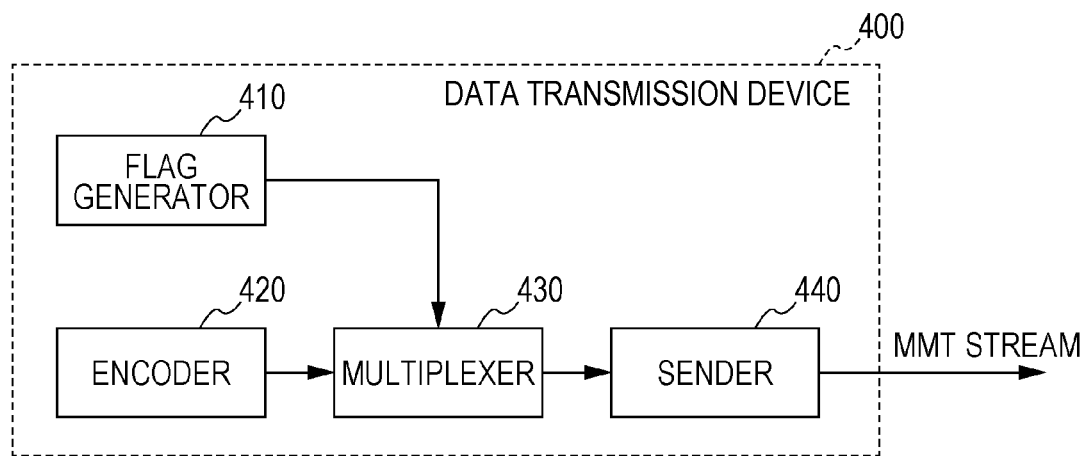
FIG. 10 is a block diagram showing an example of a configuration of a data transmission device according to the first exemplary embodiment.

Now, a data transmission device that generates and sends encoded data, according to the present exemplary embodiment will be described with reference to FIG. 10. FIG. 10 is a block diagram showing a configuration of data transmission device 400 according to the present exemplary embodiment.

As shown in FIG. 10, data transmission device 400 includes flag generator 410, encoder 420, multiplexer 430, and sender 440.

Flag generator 410 generates a flag indicating whether rearrangement of a plurality of packets forming a plurality of encoded streams which are included in encoded data is required. For example, flag generator 410 generates a flag according to a number of transmission channels which are used to transmit assets of an MMT package. Specifically, when data of the same asset is transmitted using a single transmission channel, rearrangement is not required. Thus, flag generator 410 generates a flag indicating that rearrangement is not required. Alternatively, when data of the same asset is transmitted using a plurality of transmission channels, rearrangement is required. Thus, flag generator 410 generates a flag indicating that rearrangement is required.

In addition, flag generator 410 may generate a mode flag for selecting an operating mode of rearranger 150 of data decoding device 100. Furthermore, flag generator 410 may generate information for determining sizes of buffers included in data decoding device 100, etc.

Encoder 420 encodes content including video data and audio data, based on a moving image coding standard such as HEVC, and thereby generates encoded data.

Multiplexer 430 multiplexes the encoded data on a packet basis, and thereby generates a plurality of encoded streams. For example, multiplexer 430 converts the encoded data into MP4 data, according to an MP4 file format. Then, multiplexer 430 packetizes the MP4 data and thereby generates MMT packets. Furthermore, multiplexer 430 multiplexes the plurality of MMT packets and thereby generates a plurality of MMT streams.

At this time, a number of MMT streams to be generated depends on a number of transmission channels used to perform transmission by sender 440. Specifically, multiplexer 430 generates encoded streams such that the encoded streams have a one-to-one correspondence with a plurality of transmission channels.

In addition, multiplexer 430 stores the flag generated by flag generator 410, in headers of the encoded streams, etc. For example, multiplexer 430 stores the flag in composition information, MMT messages, or the like.

Sender 440 sends, using each of the plurality of transmission channels, a corresponding encoded stream on a packet basis, and sends the flag using at least one of the plurality of transmission channels. Specifically, sender 440 sends the plurality of encoded streams generated by multiplexer 430, using the plurality of transmission channels. Specifically, sender 440 sends the encoded streams using the plurality of respective transmission channels, such that the transmission channels and the encoded streams have a one-to-one correspondence.

At this time, sender 440 may separately send composition information such as the flag before the MMT streams. For example, sender 440 sends composition information including the flag, using at least one of the plurality of transmission channels.

Note that, when data decoding device 100 selects the MPU mode or the fragment mode, all data of an MPU or a fragment needs to be buffered. Hence, multiplexer 430 constructs a size of an MPU or a fragment such that at least a size of the MPU or fragment is smaller than or equal to a buffer size. Specifically, multiplexer 430 constructs an MPU such that a maximum size of the MPU does not become larger than a sum total of sizes of first buffers 120_a_ (MMTBs).

In addition, when data decoding device 100 selects the MPU mode, a size required for first buffers 120_a_ is larger than that for other modes, and thus, buffer management becomes complicated. Hence, multiplexer 430 may limit multiplexing so as not to perform multiplexing of a plurality of assets into the same transmission channel. That is, multiplexer 430 may send one asset using only one transmission channel.

In addition, to reduce a process required for packet rearrangement by rearranger 150, when data of the same asset is transmitted using a plurality of transmission channels, a unit of packetization may be limited to only an MPU. Namely, packetization using MFUs (Movie Fragment Units) which will be described later may be prohibited.

For example, by providing a profile that allows data of the same asset to be transmitted using a plurality of transmission channels, packetization using MFUs may be prohibited in the profile. At this time, profile information may be signaled in composition information or an MMT message. Alternatively, information indicating that the unit of packetization is limited to only an MPU may be signaled for each transmission channel, using composition information or an MMT message.

In addition, when encoded data is packetized, multiplexer 430 may set the same MPU's unit for all assets forming an MMT package. For example, when an MMT package includes a video asset and an audio asset, the same MPU's playback time length is set for the video and audio assets. Specifically, multiplexer 430 may determine an MPU's unit such that a DTS of an access unit that is a first position in display (playback) order in an ith MPU of audio comes immediately before or immediately after a DTS of an access unit that is in a first position in display order in an ith MPU of video.

[Operation of the Data Transmission Device]

Figure 11:
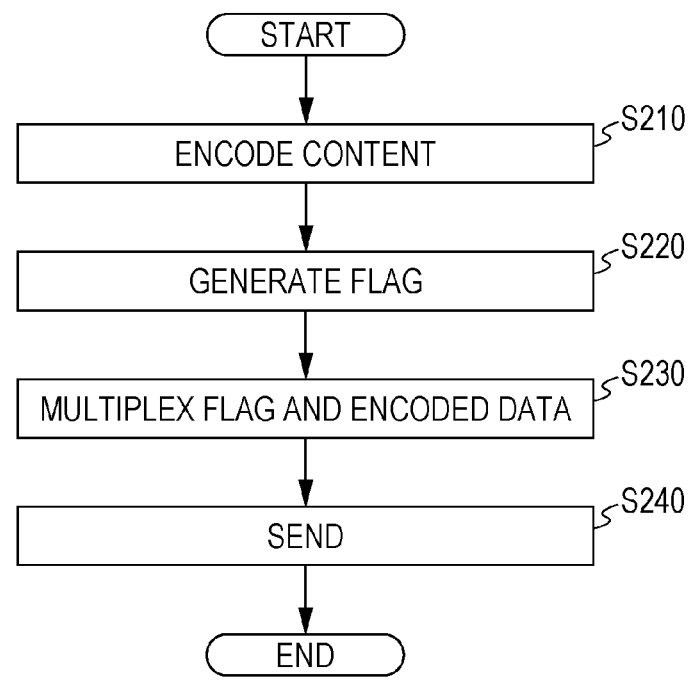
FIG. 11 is a flowchart showing an example of operation of the data transmission device according to the first exemplary embodiment.

Next, an example of operation of data transmission device 400 according to the present exemplary embodiment will be described with reference to FIG. 11. FIG. 11 is a flowchart showing an example of operation of data transmission device 400 according to the present exemplary embodiment.

First, encoder 420 encodes content including video data, etc., based on a predetermined moving image coding standard (S210). Then, flag generator 410 generates a flag indicating whether rearrangement is required (S220). As described above, flag generator 410 may also generate other information such as a mode flag.

Then, multiplexer 430 multiplexes the flag and the encoded data on a packet basis, and thereby generates a plurality of encoded streams (S230). Then, sender 440 sends, using a plurality of transmission channels, the corresponding encoded streams on a packet basis (S240). Note that, when a flag is not included in the encoded streams, sender 440 sends a flag using at least one of the plurality of transmission channels.

[Dealing with a Transmission Channel with Large Fluctuations]

Next, processes performed by data transmission device 400 and data decoding device 100 for a case of using a transmission channel with large fluctuations such as end-to-end delay or jitter will be described.

Data transmission device 400 may send information for controlling a behavior of the system decoder that is appropriate to information unique to a transmission channel, or information that instructs a behavior of the system decoder. The information unique to a transmission channel is, for example, end-to-end delay or jitter.

For example, when end-to-end delay or network jitter is not negligible, data decoding device 100 may separately include a buffer that is required to compensate for such end-to-end delay and network jitter.

At this time, data transmission device 400, for example, sends information on delay or jitter as initialization information such as composition information. Alternatively, data transmission device 400 may send information on delay, etc., as auxiliary information that can be transmitted as an MMT stream, such as an MMT message. In this case, data transmission device 400 may periodically send information on delay, etc. Alternatively, data transmission device 400 may determine and send an amount of buffering required upon starting of decoding.

Data decoding device 100 obtains information on delay, jitter, an amount of buffering, or the like, which is transmitted from data transmission device 400, and thus can perform setting of buffer sizes, determination of an amount of buffering upon starting of decoding, etc., based on the obtained information.

When broadcasting and communication are used as a plurality of transmission channels, end-to-end delay of the broadcasting is constant and there is no jitter.

Here, a header of an MMT packet includes packet send-out information of a first bit. It is assumed that data decoding device 100 receives a packet with packet send-out time S1 at time T1 for broadcasting and receives the packet at time T2 for communication.

A difference between time T1 and time T2 indicates delay time of the communication with respect to the broadcasting. Note that, when the communication is faster, the delay time has a negative value.

When the delay time exceeds a predetermined value, only decodable data that is received by the broadcasting may be decoded without waiting for a packet on a communication side to arrive. At this time, a packet whose delay time has exceeded the predetermined value on the communication side is discarded.

Data transmission device 400 may send information indicating whether to discard a packet that uses a transmission channel with large delay, or information for determining whether to discard such a packet (information such as delay time), which is included in initialization information or an MMT message. For example, if the delay time is set to 0, data received by the broadcasting can be decoded without a decoding time delayed due to an influence of transmission delay or jitter in the communication.

Note that end-to-end delay or jitter in a transmission channel may be compensated for by separately providing a buffer at a previous stage of data decoding device 100.

[Effects, Etc.]

As described above, a method for decoding data according to the present exemplary embodiment includes: a receiving step of receiving a plurality of encoded streams on a packet basis, the encoded streams being included in encoded data and having been transmitted using a plurality of respective transmission channels; a storing step of storing a plurality of packets of the received plurality of encoded streams, in first buffer 120a; a rearranging step of rearranging the plurality of packets stored in first buffer 120a, in a decoding order; and a decoding step of decoding the plurality of packets rearranged in the decoding order.

With this configuration, even when packets are transmitted using a plurality of transmission channels, since a plurality of packets stored in the first buffer are rearranged in the decoding order and decoded, the packets can be appropriately decoded. For example, by rearranging packets in the decoding order, the packets can be decoded at appropriate timing, and thus, occurrence of a buffer overflow or underflow can be reduced.

First Variant

Although the above-described exemplary embodiment describes a case in which MMT packets are packetized on an MPU basis, the present variant describes a case in which MMT packets are packetized on a division basis, the division being a unit into which an MPU is divided. Specifically, MMT packets according to the present variant are packetized on a unit (MPU fragment) basis, the MPU fragments being units into which an MPU is fragmented using MFUs.

Figure 12:
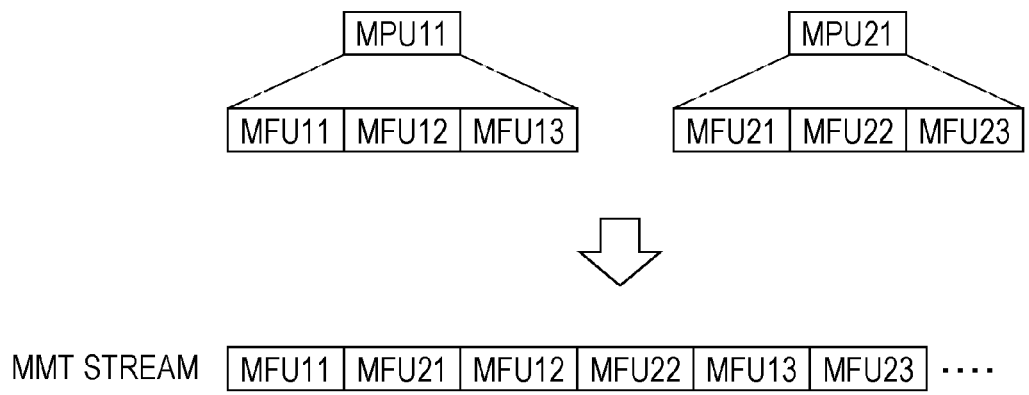
FIG. 12 is a diagram showing an example of a data structure of an MMT stream according to a first variant of the first exemplary embodiment.

FIG. 12 is a diagram showing an example of a data structure of an MMT stream according to the present variant.

In the example shown in FIG. 12, each MPU is fragmented into three MFUs. Then, by interleaving a plurality of MFUs associated with a plurality of assets, MFUs associated with different assets are multiplexed into one MMT stream. For example, as shown in FIG. 12, after MFU11 associated with video data, MFU21 associated with audio data is disposed.

Here, when packetization and multiplexing are performed on an MPU basis as in the above-described exemplary embodiment, for example, in FIG. 5, MPU20 (audio data) cannot be received until reception of MPU11 (video data) is completed. Hence, delay time occurs before decoding of MPU20 starts.

On the other hand, when packetization and multiplexing are performed on an MFU basis as in the present variant, MFU21 (audio data) can be received after reception of MFU11 (video data) is completed. In this case, too, delay time occurs before decoding of MFU21 starts, but since a size of MFU11 is smaller than a size of MPU11 and time required for reception is also reduced, delay time is also reduced.

By thus interleaving samples of video data and audio data on a fragment basis, delay time can be reduced compared to interleaving on an MPU basis. In particular, when the fragment mode and the media unit mode which are shown in FIG. 9 are used, it is preferred that a multiplexer side, i.e., a data sender side, also achieves a reduction in delay. In the present variant, by performing multiplexing on a fragment basis, a delay in time required for multiplexing on a sender side and a delay in time required before decoding on a receiver side can be reduced.

For example, as shown in the above-described exemplary embodiment and the present variant, encoded data can be packetized on an MPU or MFU basis. At this time, when data of the same asset is transmitted using a plurality of transmission channels, the same unit of packetization is set for all of the transmission channels. This is because a delay in time required for packetization on a sender side and a delay in time required for decoding on a receiver side depend on the unit of packetization.

For example, in a case of using two transmission channels, i.e., broadcasting and communication, when packetization is performed on a sample basis (on an access unit basis) on a broadcasting side, packetization is performed on a sample basis on a communication side, too. Note that when the unit of packetization is larger than an MTU (Maximum Transmission Unit) of a lower transmission layer, the unit of packetization may be divided. That is, the unit of packetization may vary between the transmission channels. The unit of packetization is an MPU, a sample (access unit), a subsample (NAL unit), or the like.

At this time, it may be prohibited, for example, to perform packetization on an MPU basis on the broadcasting side and to perform packetization on a sample basis on the communication side.

Note that in multiplexing it is guaranteed that, when an MMT stream is input to data decoding device 100, access units or subsamples can be decoded such that a buffer (second buffer 160a) does not cause an overflow and an underflow.

Note that, when MMT packets are packetized on an MPU fragment basis, decoding order obtainer 130 of data decoding device 100 determines a decoding order of access units or subsamples stored in an MFU, using a parameter indicating the decoding order of MPU fragments in an MPU and provided in a header of an MMT packet. The parameter indicating the decoding order of MPU fragments is, for example, an index number of a movie fragment to which the MFU belongs, an index number of a sample in the movie fragment, or offset information indicating a storage position in a sample.

In addition, when protocols such as RTP are used, too, the decoding order of access units and subsamples can be obtained from header information of a packet, etc.

Second Variant

Although the above-described exemplary embodiment describes an example in which data is output from first buffer 120a to second buffer 160a, in the present variant, second buffer 160a is not provided and decoder 170 decodes data that is directly output from first buffer 120a.

Figure 13:
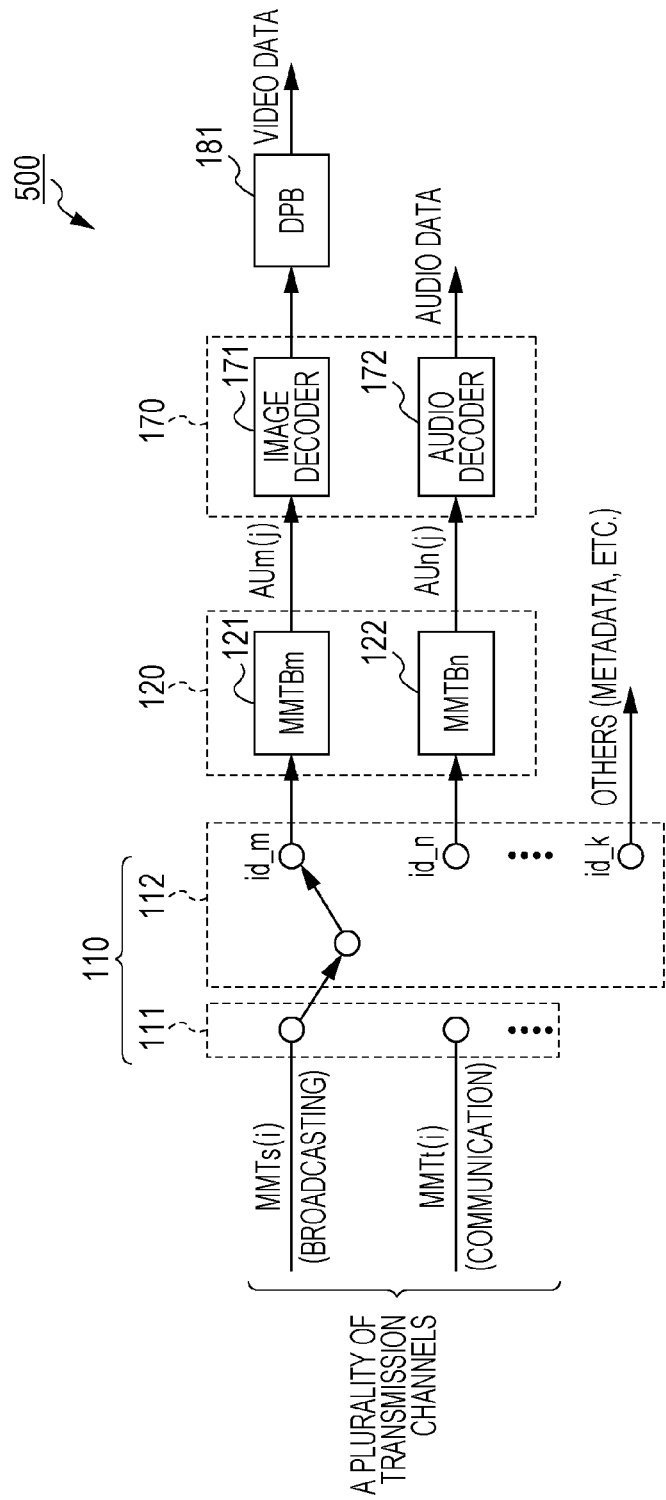
FIG. 13 is a diagram showing an example of a flow of MMT packet data according to a second variant of the first exemplary embodiment.

FIG. 13 is a diagram showing an example of a flow of MMT packet data according to the present variant.

As shown in FIG. 13, data decoding device 500 according to the present variant is not provided with second buffer 160a. An access unit that is output from MMTBm 121 is directly decoded by image decoder 171. Likewise, an access unit that is output from MMTBn 122 is directly decoded by audio decoder 172.

Data decoding device 500 according to the present variant is a simple version of data decoding device 100 according to the first exemplary embodiment, i.e., a system decoder of a simple scheme. Specifically, data decoding device 500 according to the present variant specifies only a minimum buffer size that is required for synchronous playback between assets which form an MMT package.

Specifically, a size of first buffer 120a (MMTB) is specified according to a level of a moving image encoding scheme, etc. In addition, in the MPU mode or the fragment mode, a size of an MPU or a fragment is set to be smaller than or equal to the buffer size.

For example, decoder 170 starts decoding at a point in time when data of a predetermined amount or more is stored in first buffers 120a provided for all assets (e.g., video and audio) which are synchronous playback targets. For example, time obtainer 140 obtains an initial buffer occupation amount that is required upon starting of decoding of each asset, from an audio or video encoded stream or auxiliary information which is separately transmitted. Based on the initial buffer occupation amounts obtained by time obtainer 140, rearranger 150 extracts data from first buffers 120a to decoder 170 at a point in time when data larger than or equal to the initial buffer occupation amounts is stored in first buffers 120a provided for all of the assets. Then, decoder 170 decodes the input data. Note that at a point in time when a buffer provided for any of the assets becomes full (occupation amount is 100%), rearranger 150 may extract data from the buffer to decoder 170.

Note that the simple scheme of the system decoder according to the present variant can be applied at least to a case with no occurrence of an underflow. For example, the simple scheme can be applied to a case in which a transmission rate of an MMT package is sufficiently high compared to a sum total of bit rates of respective assets forming the MMT package. In addition, the simple scheme can be applied to a case in which an MMT package accumulated in a recording medium such as a hard disk or an optical disk is played while continuously read at a sufficiently high transfer rate.

Alternatively, the simple scheme of the system decoder according to the present variant can also be applied to a case in which it is difficult to apply a system decoder that specifies operation under a constant transmission rate or jitter, due to a large change in transmission rate or jitter in a transmission channel.

Third Variant

The above-described exemplary embodiment describes an example in which, in both cases of broadcasting and communication, MMT packets are transmitted using MMT. However, for example, in a case of broadcasting, it is assumed that MMT packets are transmitted using MPEG-2 TS.

Figure 14:
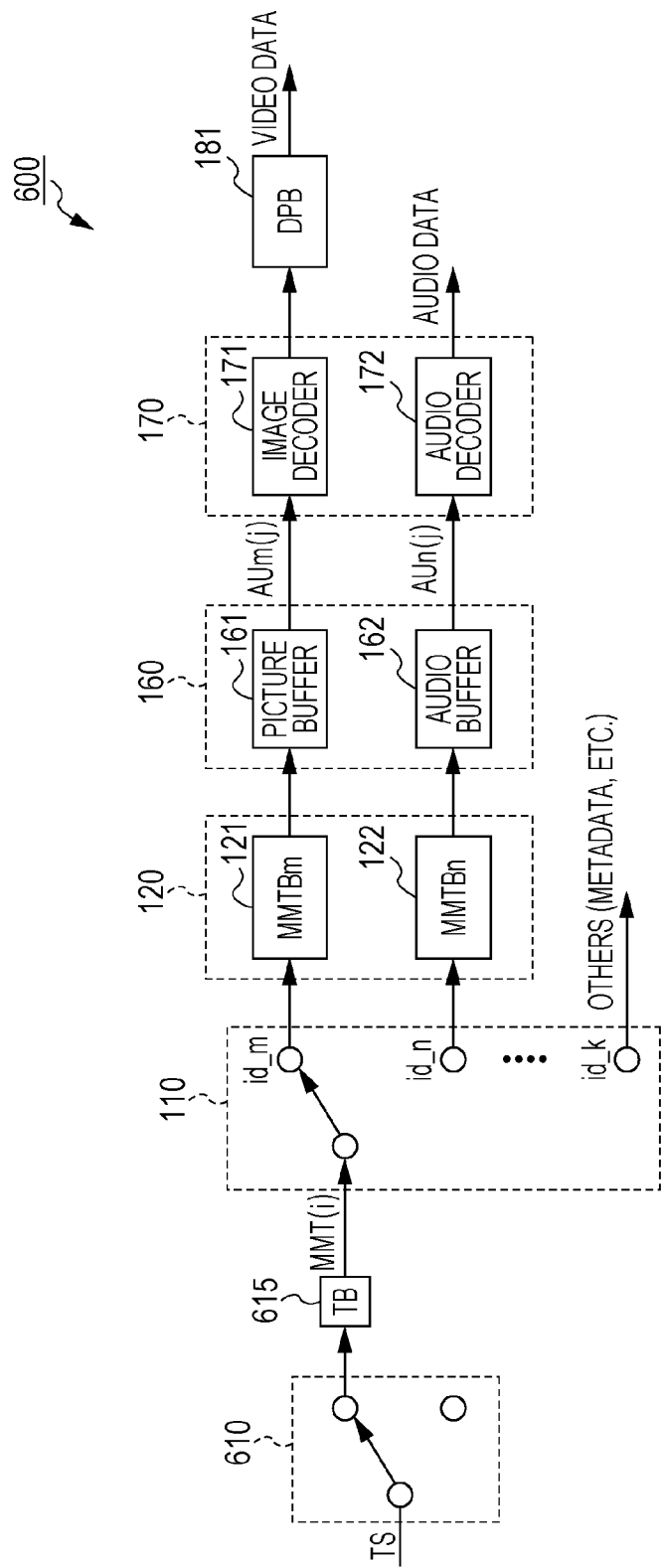
FIG. 14 is a diagram showing an example of a flow of MMT packet data according to a third variant of the first exemplary embodiment.

In the present variant, a case of transmitting MMT packets using a transport stream (TS) will be described with reference to FIG. 14. FIG. 14 is a diagram showing an example of a flow of MMT packet data according to the present variant.

As shown in FIG. 14, data decoding device 600 (system decoder) according to the present variant further includes filtering unit 610 and input buffer 615, compared to data decoding device 100 shown in FIG. 4.

As shown in FIG. 14, first, filtering unit 610 filters TS packets that transmit an MMT package, based on packet identifiers (PIDs) of a transport stream. Specifically, filtering unit 610 obtains a PID by analyzing a header of a TS packet included in the transport stream. Then, filtering unit 610 stores a TS packet with a PID indicating an MMT stream, in input buffer 615. At this time, in input buffer 615, a payload of the TS packet is stored.

Input buffer 615 separates data of the MMT package from the stored payload and outputs the packet to filtering unit 110. Processes performed after filtering unit 110 are the same as those of the first exemplary embodiment and thus description of the processes is omitted.

Note that data decoding device 600 according to the present variant can use, as a reference clock, PCR (Program Clock Reference) of the MPEG-2 system. In this case, information indicating a correspondence relationship between PCR and NTP (MMT reference clock) is obtained, and DTSs of access units, etc., are calculated as PCR-based time information.

In addition, data decoding device 600 can perform resynchronization based on PCR of a TS packet having PCR_PID.

Fourth Variant

Figure 15:
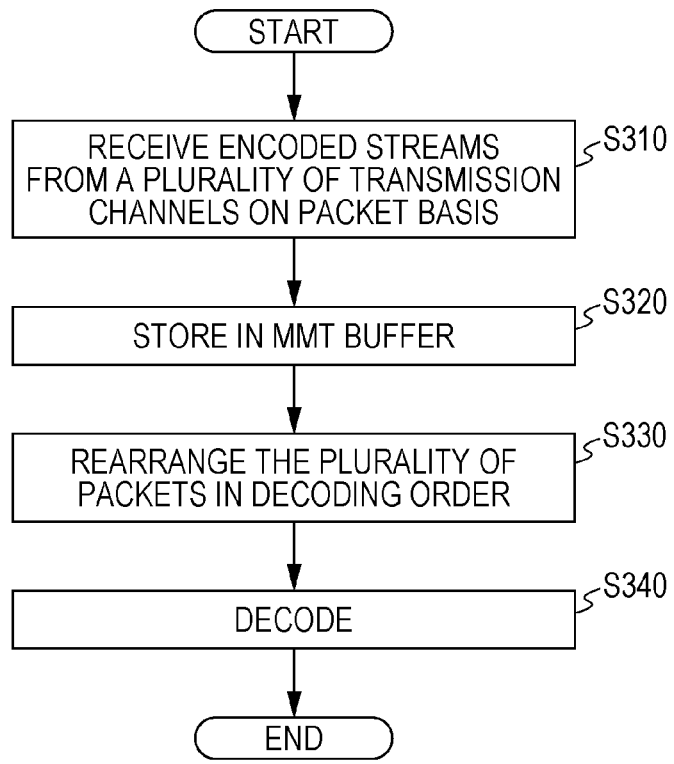
FIG. 15 is a flowchart showing an example of a method for decoding data according to a fourth variant of the first exemplary embodiment.

In addition, although the above-described exemplary embodiment shows a specific exemplary embodiment of a method for decoding data and a method for transmitting data according to the present disclosure, the methods are not limited thereto. For example, a method for decoding data according to the present variant may include a plurality of steps such as those shown in FIG. 15. FIG. 15 is a flowchart showing an example of a method for decoding data according to the present variant.

Specifically, first, a plurality of encoded streams which are included in encoded data and which have been transmitted using a plurality of respective transmission channels are received on a packet basis (S310). Then, a plurality of packets of the received plurality of encoded streams are stored in first buffers (S320). Then, the plurality of packets stored in the first buffers are rearranged in a decoding order (S330). Then, the plurality of packets rearranged in the decoding order are decoded (S340).

Figure 16:
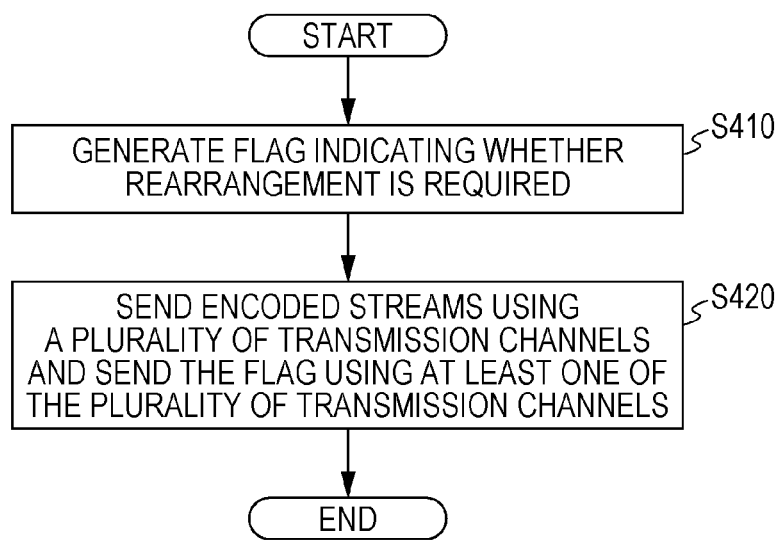
FIG. 16 is a flowchart showing an example of a method for transmission data according to the fourth variant of the first exemplary embodiment.

In addition, for example, a method for transmitting data according to the present variant may include a plurality of steps such as those shown in FIG. 16. FIG. 16 is a flowchart showing an example of a method for transmitting data according to the present variant.

Specifically, first, a flag is generated (S410). The flag indicates whether rearrangement of a plurality of packets forming a plurality of encoded streams which are included in encoded data is required. Then, using a plurality of transmission channels, the corresponding encoded streams are transmitted on a packet basis, and the flag is transmitted using at least one of the plurality of transmission channels (S420).

Second Exemplary Embodiment

By recording, in a storage medium, a program for implementing a configuration of a method for transmitting data (a method for encoding a moving image (a method for encoding an image)) or a method for decoding data (a method for decoding a moving image (a method for decoding an image)) which is shown in the above-described exemplary embodiment, processes shown in the above-described exemplary embodiment can be easily performed in an independent computer system. The storage medium may be any as long as the storage medium can record the program, such as a magnetic disk, an optical disk, a magneto-optical disk, an IC card, or a semiconductor memory.

Here, application examples of the method for transmitting data (the method for encoding a moving image (the method for encoding an image)) and the method for decoding data (the method for decoding a moving image (the method for decoding an image)) which are shown in the above-described exemplary embodiment, and systems using the methods will be further described. The system is characterized by including an image encoding and decoding device including: a data transmission device (image encoding device) that uses the method for transmitting data (the method for encoding an image); and a data decoding device (image decoding device) that uses the method for decoding data (the method for decoding an image). Other configurations of the system can be appropriately changed according to circumstances.

Figure 17:
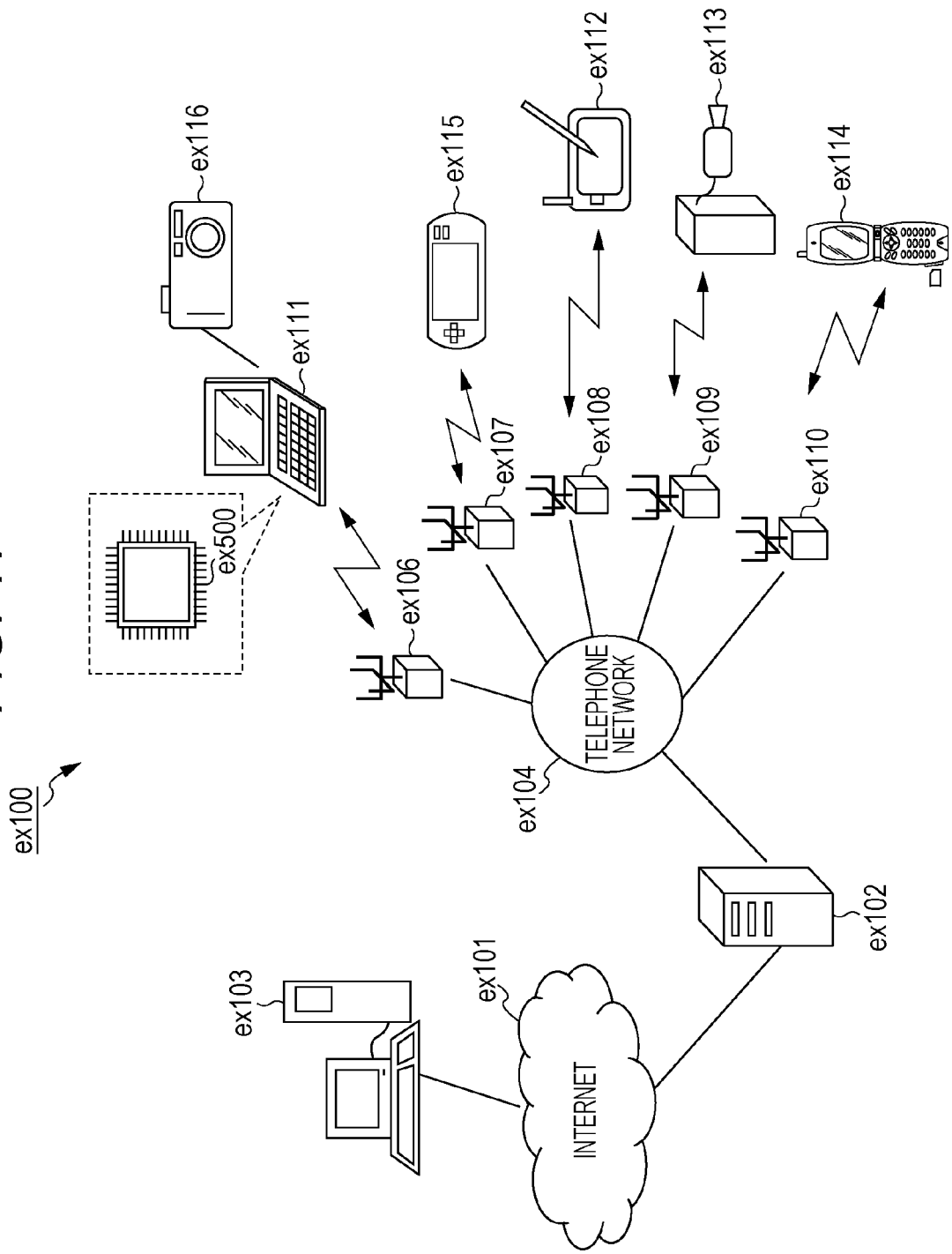
FIG. 17 is an overall configuration diagram of a content supply system that implements a content distribution service.

FIG. 17 is a diagram showing an overall configuration of content supply system ex100 that implements a content distribution service. A communication service providing area is divided into cells with a desired size, and base stations ex106, ex107, ex108, ex109, and ex110 which are fixed radio stations are placed in the respective cells.

In this content supply system ex100, to Internet ex101 are connected various devices such as computer ex111, PDA (Personal Digital Assistant) ex112, camera ex113, mobile phone ex114, and game machine ex115 through Internet service provider ex102 and telephone network ex104, and base stations ex106 to ex110.

However, a configuration of content supply system ex100 is not limited to that shown in FIG. 17, and any of the components may be combined and connected to each other. In addition, the devices may be directly connected to telephone network ex104 without through base stations ex106 to ex110 which are fixed radio stations. In addition, the devices may be directly interconnected through near-field radio, etc.

Camera ex113 is a device capable of shooting moving images, such as a digital video camera, and camera ex116 is a device capable of shooting still images and moving images, such as a digital camera. In addition, mobile phone ex114 may be, for example, a mobile phone of a GSM (registered trademark) (Global System for Mobile Communications) system, a CDMA (Code Division Multiple Access) system, a W-CDMA (Wideband-Code Division Multiple Access) system, or an LTE (Long Term Evolution) system or HSPA (High Speed Packet Access), or a PHS (Personal Handyphone System), and may be any of the above.

In content supply system ex100, live distribution or the like can be performed while camera ex113 or the like is connected to streaming server ex103 through base station ex109 and telephone network ex104. In the live distribution, an encoding process is performed on content (e.g., video of live music, etc.) which is shot by a user using camera ex113, in a manner described in the above-described exemplary embodiment (i.e., camera ex113 functions as an image encoding device according to one aspect of the present disclosure), and the content is transmitted to streaming server ex103. Streaming server ex103, on the other hand, streams the transmitted content data to requesting clients. The clients are, for example, computer ex111, PDA ex112, camera ex113, mobile phone ex114, and game machine ex115 that can decode the above-described data having been subjected to the encoding process. Each device having received the streamed data performs a decoding process on the received data, and plays the decoded data (i.e., the device functions as an image decoding device according to one aspect of the present disclosure).

Note that an encoding process for the shot data may be performed by camera ex113, or may be performed by streaming server ex103 that performs a data transmitting process, or may be performed by camera ex113 and streaming server ex103 in a shared manner. Likewise, a decoding process for the streamed data may be performed by the clients, or may be performed by streaming server ex103, or may be performed by the clients and streaming server ex103 in a shared manner. In addition, still image and/or moving image data which is shot by camera ex116 instead of camera ex113 may be transmitted to streaming server ex103 through computer ex111. An encoding process in this case may be performed by any of camera ex116, computer ex111, and streaming server ex103, or may be performed by camera ex116, computer ex111, and streaming server ex103 in a shared manner.

In addition, these encoding and decoding processes are performed by LSI ex500 generally included in computer ex111 or in each device. LSI ex500 may be formed of one chip or a plurality of chips. Note that software for moving image encoding and decoding may be installed in some kind of recording medium (a CD-ROM, a flexible disk, a hard disk, etc.) that can be read by computer ex111 or the like, and encoding and decoding processes may be performed using the software. Furthermore, when mobile phone ex114 has a camera, moving image data that is obtained by the camera may be transmitted. The moving image data at this time is data having been subjected to an encoding process by LSI ex500 included in mobile phone ex114.

In addition, streaming server ex103 may be a plurality of servers or a plurality of computers and may process, record, or distribute data in a distributed manner.

In the above-described manner, in content supply system ex100, clients can receive and play encoded data. As such, in content supply system ex100, clients can receive, decode, and play information having been transmitted from a user, in real time. Accordingly, even a user that does not have any special right or equipment can implement personal broadcasting.

Figure 18:
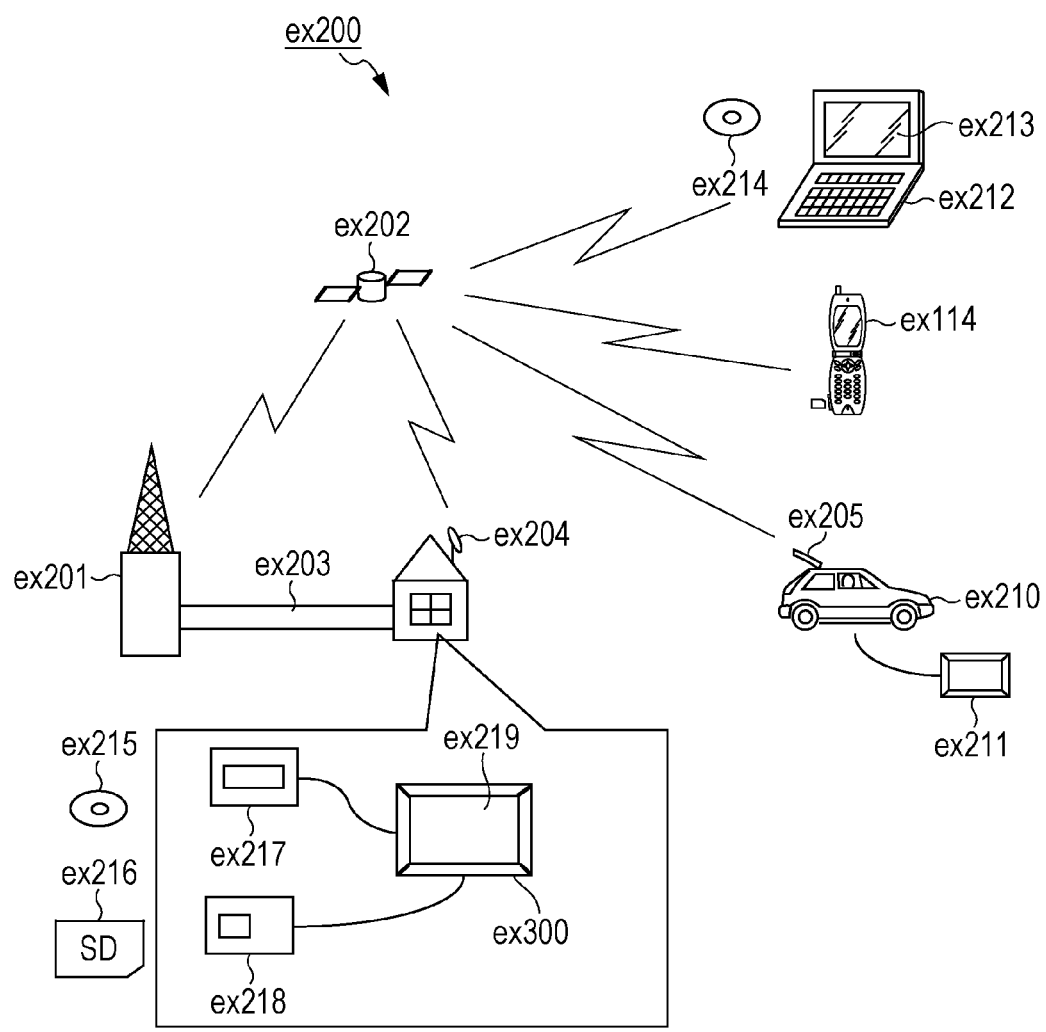
FIG. 18 is an overall configuration diagram of a digital broadcasting system.

Note that in addition to the example of content supply system ex100, as shown in FIG. 18, at least either one of the moving image encoding device (image encoding device) and the moving image decoding device (image decoding device) of the above-described exemplary embodiment can be incorporated in digital broadcasting system ex200, too. Specifically, in broadcast station ex201, multiplexed data where music data or the like is multiplexed into video data is transmitted to communication or satellite ex202 through a radio wave. This video data is data encoded by the method for encoding a moving image which is described in the above-described exemplary embodiment (i.e., data encoded by the image encoding device according to one aspect of the present disclosure). Satellite ex202 having received the data sends out a broadcasting radio wave, and household antenna ex204 capable of receiving satellite broadcasting receives the radio wave. A device such as television (receiver) ex300 or set-top box (STB) ex217 decodes and plays the received multiplexed data (i.e., the device functions as the image decoding device according to one aspect of the present disclosure).

In addition, it is also possible to implement the moving image decoding device or the moving image encoding device which is shown in the above-described exemplary embodiment, in reader/recorder ex218 that reads and decodes multiplexed data recorded in recording medium ex215 such as a DVD or a BD, or that encodes a video signal and further multiplexes, in some cases, a music signal into the video signal, and then writes the video signal or the multiplexed signals to recording medium ex215. In this case, the played video signal is displayed on monitor ex219, and the video signal can be played in other devices or systems by recording medium ex215 in which the multiplexed data is recorded. Alternatively, the moving image decoding device may be implemented in set-top box ex217 connected to cable ex203 for cable television or to antenna ex204 for satellite/terrestrial broadcasting, and the video signal may be displayed on monitor ex219 of a television. At this time, the moving image decoding device may be incorporated in the television instead of set-top box ex217.

Figure 19:
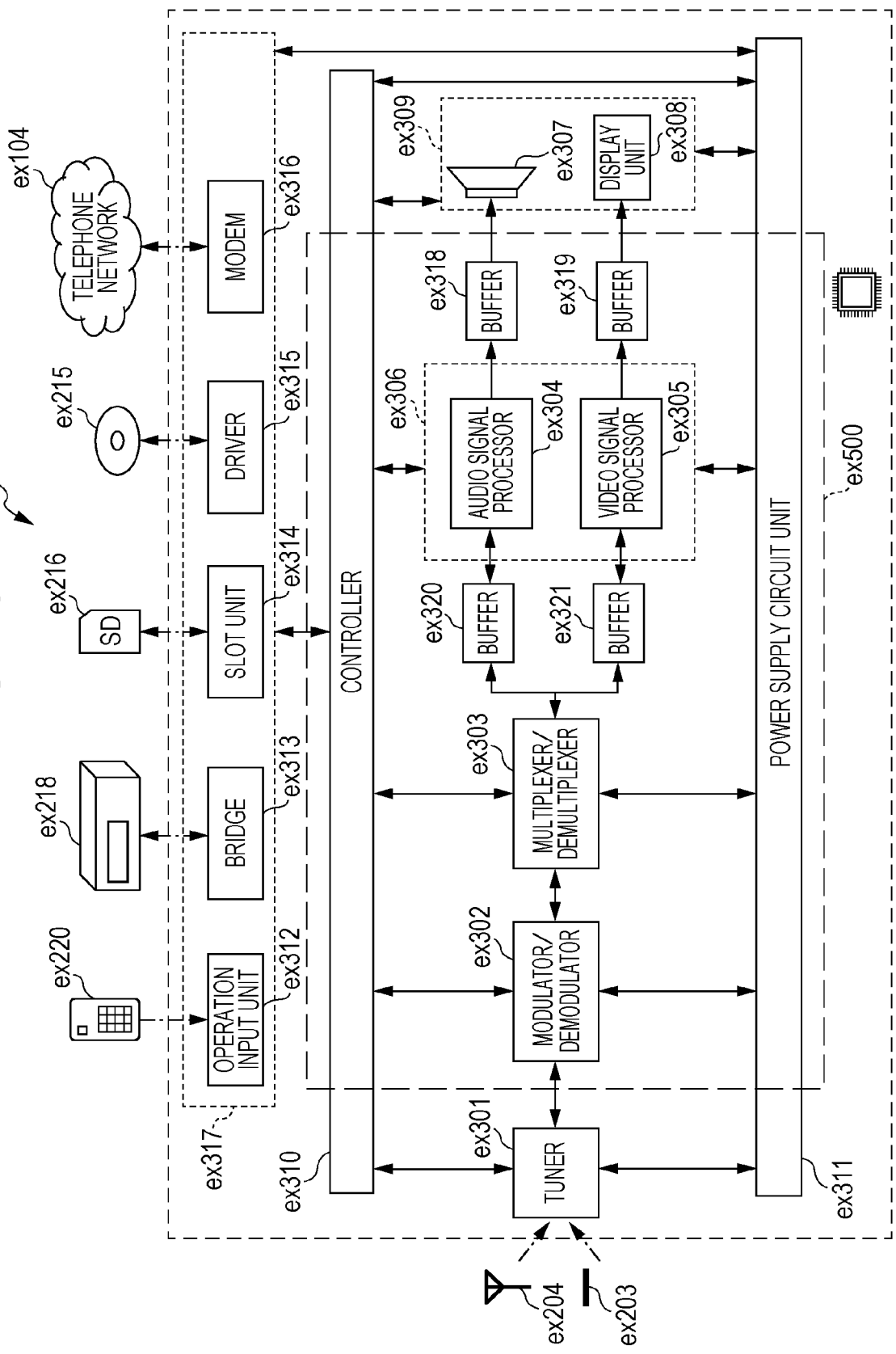
FIG. 19 is a block diagram showing an example of a configuration of a television.

FIG. 19 is a diagram showing television (receiver) ex300 that uses the method for decoding a moving image and the method for encoding a moving image which are described in the above-described exemplary embodiment. Television ex300 includes tuner ex301 that obtains or outputs multiplexed data where audio data is multiplexed into video data, through antenna ex204, cable ex203, or the like, which receives the above-described broadcasting; modulator/demodulator ex302 that demodulates the received multiplexed data or modulates data into multiplexed data to be transmitted to an external source; and multiplexer/demultiplexer ex303 that demultiplexes the demodulated multiplexed data into video data and audio data or multiplexes video data and audio data which are encoded by signal processor ex306.

In addition, television ex300 includes signal processor ex306 including audio signal processor ex304 and video signal processor ex305 that decode audio data and video data, respectively, or that encode pieces of information, respectively (audio signal processor ex304 and video signal processor ex305 function as the image encoding device or image decoding device according to one aspect of the present disclosure); and output unit ex309 including speaker ex307 that outputs a decoded audio signal, and display unit ex308 such as a display that displays a decoded video signal. Furthermore, television ex300 includes interface unit ex317 including, for example, operation input unit ex312 that accepts an input of a user operation. Furthermore, television ex300 includes controller ex310 that performs overall control of each component; and power supply circuit unit ex311 that supplies power to each component. Interface unit ex317 may include, in addition to operation input unit ex312, for example, bridge ex313 connected to external devices such as reader/recorder ex218; slot unit ex314 that allows recording medium ex216 such as an SD card to be placed into slot unit ex314; driver ex315 for connecting to external recording media such as a hard disk; and modem ex316 connected to telephone network ex104. Note that recording medium ex216 is a medium that allows for electrical recording of information by a nonvolatile/volatile semiconductor memory device stored in recording medium ex216. The components of television ex300 are connected to each other through a synchronous bus.

First, a configuration will be described in which television ex300 decodes and plays multiplexed data which is obtained by antenna ex204 or the like from an external source. Television ex300 receives a user operation from remote controller ex220 or the like and demultiplexes, by multiplexer/demultiplexer ex303, multiplexed data having been demodulated by modulator/demodulator ex302, based on control of controller ex310 including a CPU, etc. Furthermore, television ex300 decodes, by audio signal processor ex304, demultiplexed audio data and decodes, by video signal processor ex305, demultiplexed video data using the decoding method described in the above-described exemplary embodiment. Each of decoded audio and video signals is output to an external source from output unit ex309. Upon the output, in order that the audio signal and the video signal are played in synchronization with each other, these signals may be temporarily accumulated in buffers ex318 and ex319, etc. In addition, television ex300 may read multiplexed data from recording medium ex215 or ex216 such as a magnetic/optical disk or an SD card, instead of from broadcasting, etc. Next, a configuration will be described in which television ex300 encodes an audio signal and a video signal, and sends the encoded audio and video signals to an external source or writes the encoded audio and video signals to a recording medium or the like. Television ex300 receives a user operation from remote controller ex220 or the like and encodes, by audio signal processor ex304, an audio signal and encodes, by video signal processor ex305, a video signal using the encoding method described in the above-described exemplary embodiment, based on control of controller ex310. The encoded audio and video signals are multiplexed by multiplexer/demultiplexer ex303, and the multiplexed signals are output to an external source. Upon the multiplexing, in order that the audio signal and the video signal are synchronized to each other, these signals may be temporarily accumulated in buffers ex320 and ex321, etc. Note that a plurality of buffers ex318, ex319, ex320, and ex321 may be provided as shown in the figure, or a configuration may be such that one or more buffers are shared. Furthermore, in addition to the configuration shown in the figure, for example, data may be accumulated in a buffer as a buffer member for avoiding a system overflow or underflow between modulator/demodulator ex302 and multiplexer/demultiplexer ex303, too.

In addition to obtaining audio data and video data from broadcasting, etc., or from a recording medium, etc., television ex300 may be configured to accept an AV input from a microphone and a camera, and may perform an encoding process on data obtained from the microphone and the camera. Note that although here television ex300 is described as being configured to be able to perform the above-described encoding process, multiplexing, and external output, television ex300 may not be able to perform these processes and may be configured to be able to perform only the above-described reception, decoding process, and external output.

In addition, when reader/recorder ex218 reads or writes multiplexed data from/to a recording medium, the above-described decoding process or encoding process may be performed by either one of television ex300 and reader/recorder ex218, or may be performed by television ex300 and reader/recorder ex218 in a shared manner.

Figure 20:
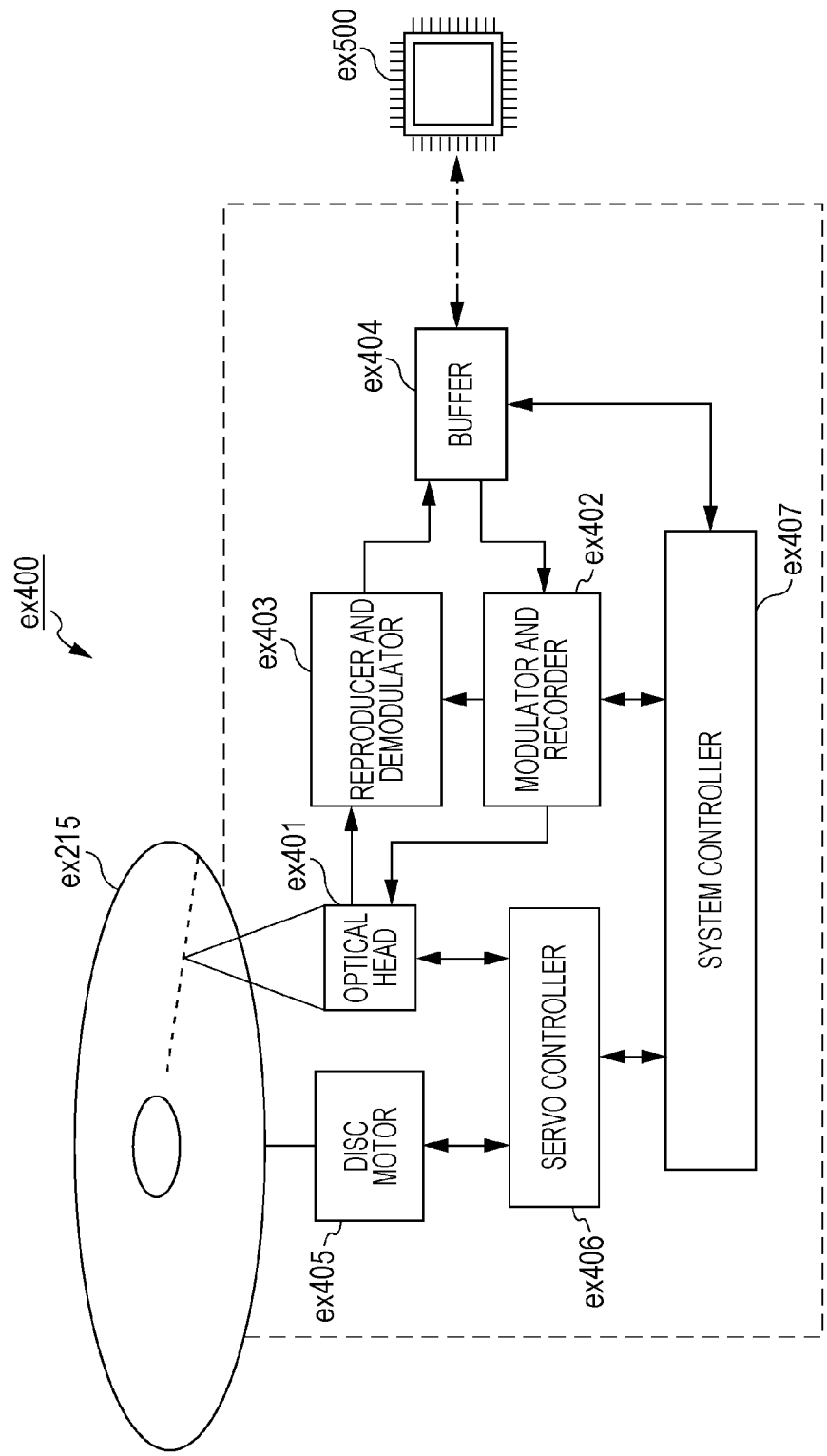
FIG. 20 is a block diagram showing an example of a configuration of an information reproducer/recorder that reads and writes information from/to a recording medium which is an optical disk.

As an example, there is shown in FIG. 20 a configuration of information reproducer/recorder ex400 for a case of reading or writing data from/to an optical disk. Information reproducer/recorder ex400 includes components ex401, ex402, ex403, ex404, ex405, ex406, and ex407 which will be described below. Optical head ex401 writes information by irradiating a recording surface of recording medium ex215 which is an optical disk, with a laser spot and reads information by detecting reflected light from the recording surface of recording medium ex215. Modulator and recorder ex402 modulates laser light according to recorded data by electrically driving a semiconductor laser included in optical head ex401. Reproducer and demodulator ex403 amplifies a reproduced signal which is obtained by electrically detecting reflected light from the recording surface by a photodetector included in optical head ex401, and demodulates the reproduced signal by separating a signal component recorded in recording medium ex215, and thereby reproduces required information. Buffer ex404 temporarily holds information to be recorded in recording medium ex215 and information reproduced from recording medium ex215. Disk motor ex405 rotates recording medium ex215. Servo controller ex406 performs a laser spot tracking process by allowing optical head ex401 to move to a predetermined information track while controlling rotary driving of disk motor ex405. System controller ex407 controls entire information reproducer/recorder ex400. The above-described reading and writing processes are implemented by system controller ex407 using various types of information held in buffer ex404 and, if necessary, performing generation and addition of new information, and performing recording and reproduction of information through optical head ex401 while allowing modulator and recorder ex402, reproducer and demodulator ex403, and servo controller ex406 to operate in cooperation with each other. System controller ex407 is configured by, for example, a microprocessor, and executes reading and writing programs and thereby performs reading and writing processes.

Although the above describes that optical head ex401 irradiates the recording surface with a laser spot, a configuration may be such that higher density recording is performed using near-filed light.

Figure 21:
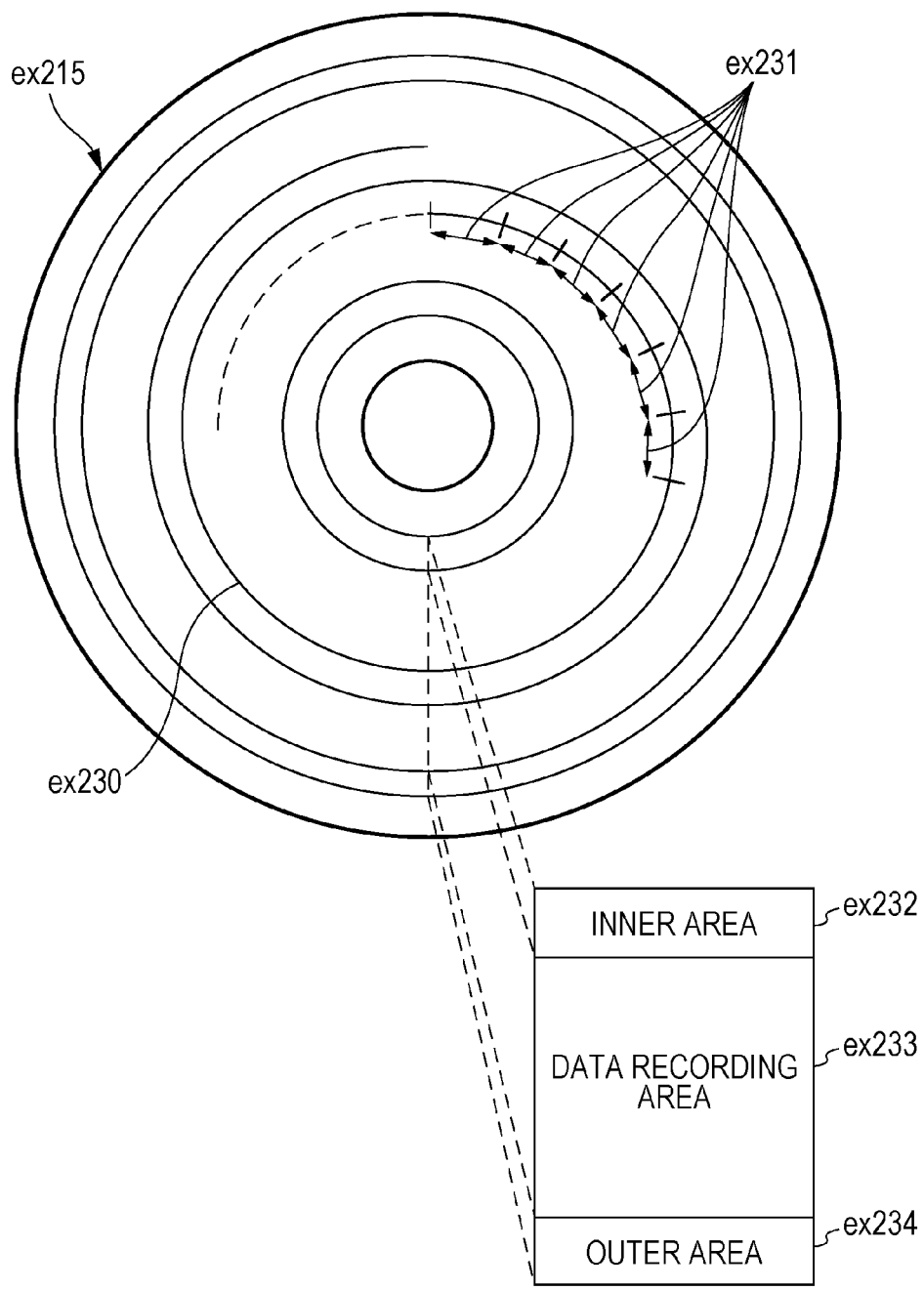
FIG. 21 is a diagram showing an example of a structure of the recording medium which is an optical disk.

FIG. 21 shows a schematic diagram of recording medium ex215 which is an optical disk. Guide grooves (grooves) are spirally formed on a recording surface of recording medium ex215, and address information indicating an absolute position on the disk by a change in a shape of a groove is recorded in advance in information track ex230. The address information includes information for identifying a position of recording block ex231 which is a unit of recording data. A device that performs recording and reproduction can identify recording block ex231 by reading address information by reproducing information track ex230. In addition, recording medium ex215 includes data recording areas ex233, inner areas ex232, and outer areas ex234. An area used to record user data is data recording area ex233. Inner area ex232 and outer area ex234 which are disposed inner or outer than data recording area ex233 are used for specific applications other than recording of user data. Information reproducer/recorder ex400 reads or writes encoded audio data, encoded video data, or multiplexed data where the encoded audio data and video data are multiplexed, from/to data recording area ex233 of such recording medium ex215.

Although the above describes, as an example, an optical disk such as a single-layer DVD or BD, the optical disk is not limited thereto, and the optical disk may be one that has a multi-layer structure and is capable of performing recording on portions other than a surface. In addition, the optical disk may be one having a structure in which multidimensional recording/reproduction is performed, e.g., recording of information at the same location of the disk using light beams of colors of various different wavelengths, or recording of different information layers from various angles.

In addition, it is also possible that, in digital broadcasting system ex200, car ex210 having antenna ex205 receives data from satellite ex202 or the like, and plays a moving image on a display device such as car navigation system ex211 included in car ex210. Note that, examples of a configuration of car navigation system ex211 include a configuration in which a GPS receiver is added to a configuration shown in FIG. 19, and a similar configuration may also be applied to computer ex111, mobile phone ex114, etc.

Figure 22A:
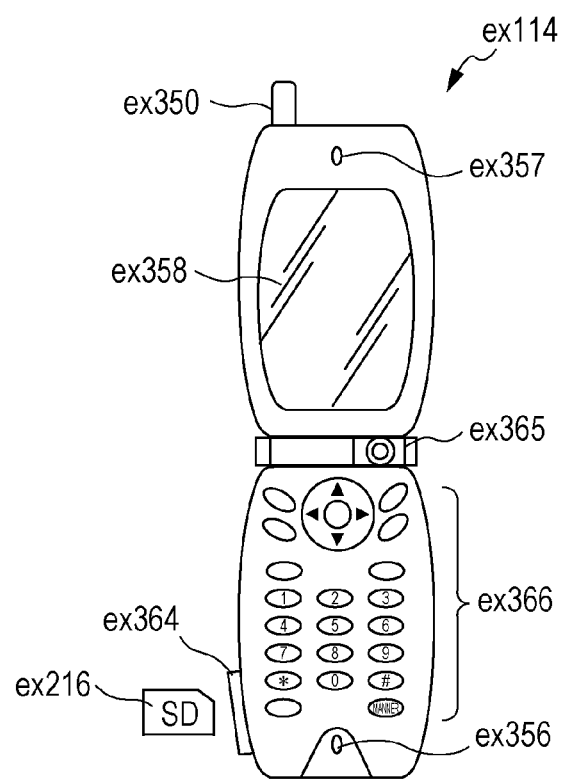
FIG. 22A is a diagram showing an example of a mobile phone.

FIG. 22A is a diagram showing mobile phone ex114 that uses the method for decoding a moving image and the method for encoding a moving image which are described in the above-described exemplary embodiment. Mobile phone ex114 includes antenna ex350 for transmitting and receiving radio waves to/from base station ex110; camera unit ex365 capable of shooting video and still images; and display unit ex358 such as a liquid crystal display that displays data obtained by decoding video which is captured by camera unit ex365, video received by antenna ex350, and the like. Mobile phone ex114 further includes a main body unit having operating key unit ex366; audio output unit ex357 which is a speaker or the like for outputting audio; audio input unit ex356 which is a microphone or the like for receiving audio; and memory unit ex367 that saves shot video and still images, recorded audio, or encoded or decoded data of received video, still images, emails, etc., or slot unit ex364 which is an interface unit for a recording medium that saves data in the same manner as memory unit ex367.

Figure 22B:
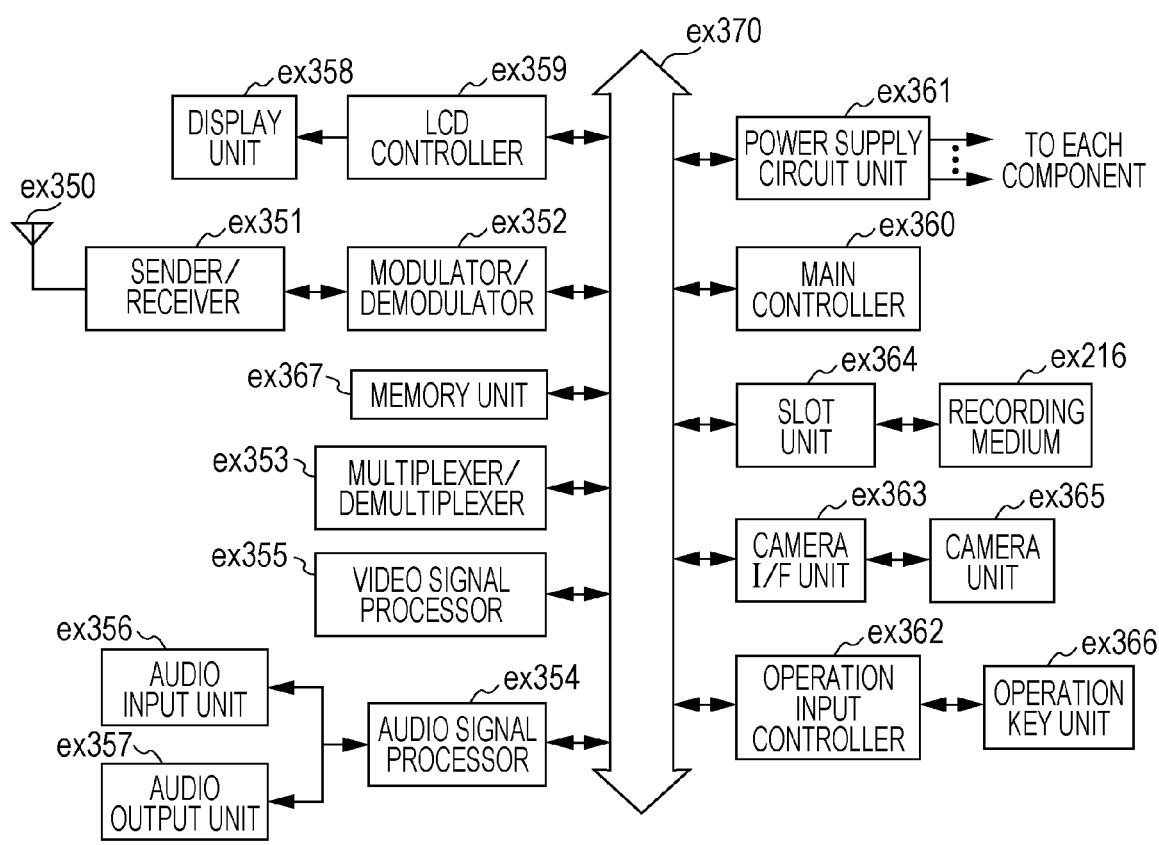
FIG. 22B is a block diagram showing an example of a configuration of the mobile phone.

Furthermore, an example of a configuration of mobile phone ex114 will be described with reference to FIG. 22B. In mobile phone ex114, power supply circuit unit ex361, operation input controller ex362, video signal processor ex355, camera interface unit ex363, LCD (Liquid Crystal Display) controller ex359, modulator/demodulator ex352, multiplexer/demultiplexer ex353, audio signal processor ex354, slot unit ex364, and memory unit ex367 are connected through synchronous bus ex370 to main controller ex360 that performs overall control of each component of the main body unit having display unit ex358 and operating key unit ex366.

When an end/power key is brought to an on state by a user operation, power supply circuit unit ex361 supplies power to each component from a battery pack, and thereby activates mobile phone ex114 to an operable state.

In mobile phone ex114, based on control of main controller ex360 including a CPU, a ROM, a RAM, etc., audio signal processor ex354 converts an audio signal that is collected by audio input unit ex356 at audio call mode into a digital audio signal, modulator/demodulator ex352 performs a spread spectrum process on the digital audio signal, sender/receiver ex351 performs a digital-analog conversion process and a frequency conversion process on the signal, and then, sends the signal through antenna ex350. In addition, in mobile phone ex114, received data that is received through antenna ex350 at audio call mode is amplified, and the amplified data is subjected to a frequency conversion process and an analog-digital conversion process. Then, modulator/demodulator ex352 performs an inverse spread spectrum process on the data, and audio signal processor ex354 converts the data into an analog audio signal, and then, the analog audio signal is output from audio output unit ex357.

Furthermore, in a case of transmitting an email at data communication mode, text data of an email which is input by an operation performed on operating key unit ex366, etc., of the main body unit is transmitted out to main controller ex360 through operation input controller ex362. Main controller ex360 allows modulator/demodulator ex352 to perform a spread spectrum process on the text data, and allows sender/receiver ex351 to perform a digital-analog conversion process and a frequency conversion process on the text data and then send an analog signal to base station ex110 through antenna ex350. In a case of receiving an email, substantially inverse processes to the above-described processes are performed on received data, and the data is output to display unit ex358.

In a case of transmitting video, a still image, or video and audio at data communication mode, video signal processor ex355 compresses and encodes a video signal supplied from camera unit ex365, by the method for encoding a moving image which is shown in the above-described exemplary embodiment (i.e., video signal processor ex355 functions as the image encoding device according to one aspect of the present disclosure), and sends out encoded video data to multiplexer/demultiplexer ex353. In addition, audio signal processor ex354 encodes an audio signal that is collected by audio input unit ex356 during capturing of video, a still image, or the like, by camera unit ex365, and sends out encoded audio data to multiplexer/demultiplexer ex353.

Multiplexer/demultiplexer ex353 multiplexes the encoded video data supplied from video signal processor ex355, and the encoded audio data supplied from audio signal processor ex354 by a predetermined scheme. Modulator/demodulator (modulation/demodulation circuit unit) ex352 performs a spread spectrum process on the resulting multiplexed data, and sender/receiver ex351 performs a digital-analog conversion process and a frequency conversion process on the data and then sends the data through antenna ex350.

In a case of receiving data of a moving image file which is linked to a website, etc., at data communication mode, or a case of receiving an email having video and/or audio attached to the email, in order to decode multiplexed data received through antenna ex350, multiplexer/demultiplexer ex353 demultiplexes the multiplexed data and thereby divides the multiplexed data into a bit stream of video data and a bit stream of audio data, and supplies the encoded video data to video signal processor ex355 through synchronous bus ex370 and supplies the encoded audio data to audio signal processor ex354 through synchronous bus ex370. Video signal processor ex355 decodes a video signal by performing decoding by a method for decoding a moving image which is appropriate to the method for encoding a moving image shown in the above-described exemplary embodiment (i.e., video signal processor ex355 functions as the image decoding device according to one aspect of the present disclosure). Thus, for example, video or a still image included in a moving image file which is linked to a website is displayed on display unit ex358 through LCD controller ex359. In addition, audio signal processor ex354 decodes an audio signal. Thus, audio is output from audio output unit ex357.

In addition, as with television ex300, for a terminal such as above-described mobile phone ex114, three implementation forms are considered: a send/receive type terminal including both an encoder and a decoder, a transmission terminal including only an encoder, and a receiving terminal including only a decoder. Furthermore, although it is described that in digital broadcasting system ex200 multiplexed data where music data or the like is multiplexed into video data is received and sent, the data to be received and transmitted may be data where, in addition to audio data, text data, etc., related to video is multiplexed, or may be video data itself instead of multiplexed data.

As such, the method for encoding a moving image or the method for decoding a moving image which is shown in the above-described exemplary embodiment can be used for any of the above-described devices and systems. By doing so, the effects described in the above-described exemplary embodiment can be obtained.

In addition, the present disclosure is not limited to the above-described exemplary embodiment, and various alterations or modifications may be made without departing from the scope of the present disclosure.

Third Exemplary Embodiment

It is also possible to generate video data by appropriately switching, as necessary, between any of the methods for encoding a moving image or any of the moving image encoding devices which are shown in the above-described exemplary embodiments, and a method for encoding a moving image or a moving image encoding device that complies with a different standard such as MPEG-2, MPEG4-AVC, or VC-1.

Here, when a plurality of pieces of video data complying with different standards are generated, upon decoding there is a need to select a decoding method appropriate to each standard. However, since it cannot be identified which standard a piece of video data to be decoded complies with, there is a problem that an appropriate decoding method cannot be selected.

To solve this problem, multiplexed data where audio data or the like is multiplexed into video data is configured to include identification information indicating which standard the video data complies with. A specific configuration of multiplexed data including video data which is generated by any of the methods for encoding a moving image or any of the moving image encoding devices shown in the above-described exemplary embodiments will be described below. The multiplexed data is a digital stream of an MPEG-2 transport stream format.

FIG. 23 is a diagram showing a configuration of multiplexed data. As shown in FIG. 23, the multiplexed data can be obtained by multiplexing one or more of a video stream, an audio stream, a presentation graphics stream (PG), and an interactive graphics stream. The video stream indicates main video and subvideo of a movie, the audio stream indicates a main audio portion of the movie and subaudio mixed with the main audio, and the presentation graphics stream indicates subtitles of the movie. Here, the main video indicates normal video displayed on a screen, and the subvideo indicates video displayed on a small screen in the main video. In addition, the interactive graphics stream indicates an interactive screen which is created by disposing GUI components on a screen. The video stream is encoded by any of the methods for encoding a moving image or any of the moving image encoding devices which are shown in the above-described exemplary embodiments, or by a method for encoding a moving image or a moving image encoding device that complies with a conventional standard such as MPEG-2, MPEG4-AVC, or VC-1. The audio stream is encoded by a scheme such as Dolby AC-3, Dolby Digital Plus, MLP, DTS, DTS-HD, or linear PCM.

Each stream included in the multiplexed data is identified by a PID. For example, 0x1011 is assigned to a video stream used for video of a movie, 0x1100 to 0x111F are assigned to audio streams, 0x1200 to 0x121F are assigned to presentation graphic streams, 0x1400 to 0x141F are assigned to interactive graphics streams, 0x1B00 to 0x1B1F are assigned to video streams used for subvideo of the movie, and 0x1A00 to 0x1A1F are assigned to audio streams used for main audio and subaudio mixed with the main audio.

Figure 24:
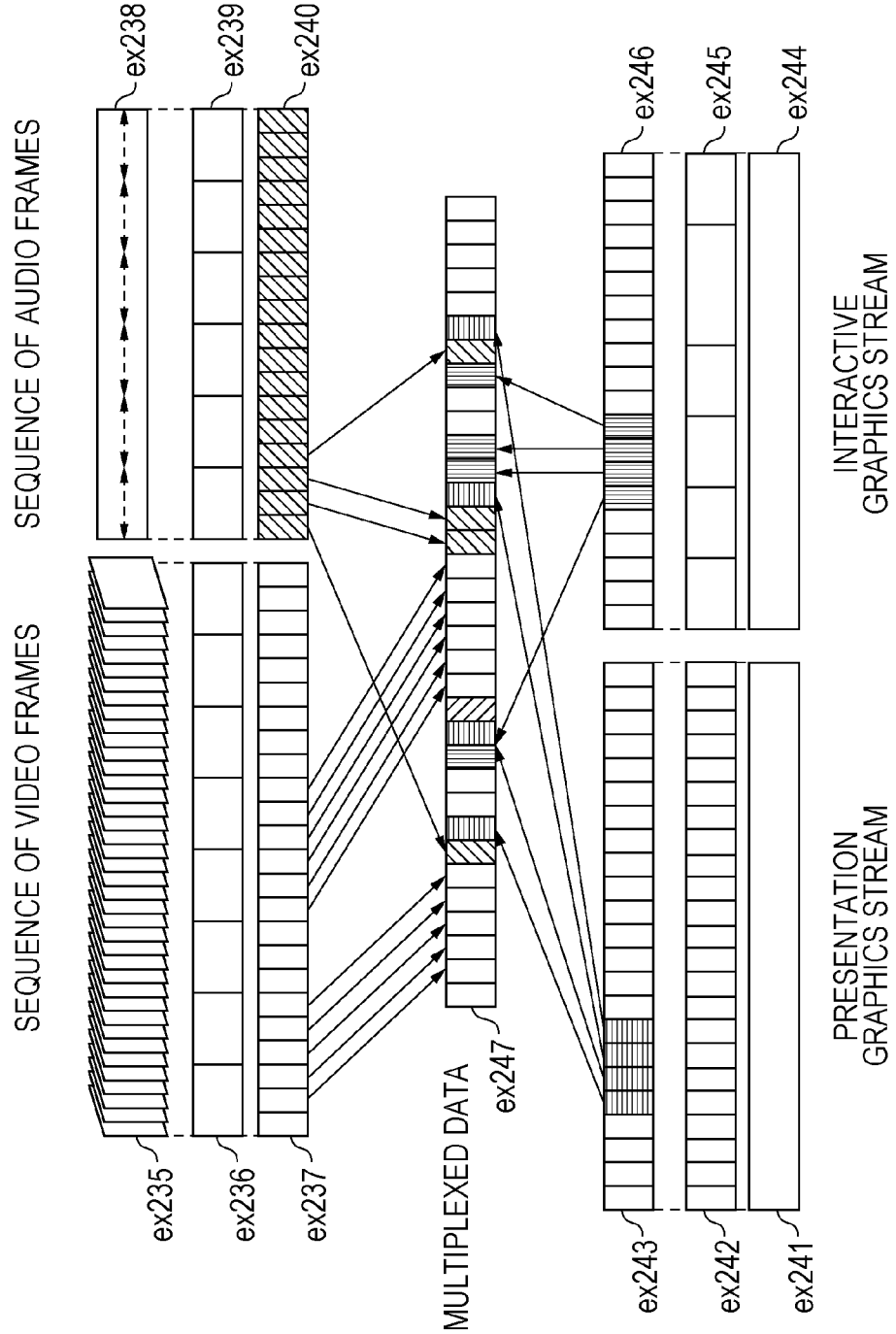
FIG. 24 is a diagram schematically showing how each stream is multiplexed in multiplexed data.

FIG. 24 is a diagram schematically showing how multiplexed data is multiplexed. First, video stream ex235 including a plurality of video frames and audio stream ex238 including a plurality of audio frames are converted into sequences ex236 and ex239 of PES packets, respectively, and then sequences ex236 and ex239 of PES packets are converted into TS packets ex237 and ex240. Likewise, pieces of data of presentation graphics stream ex241 and interactive graphic streams ex244 are converted into sequences ex242 and ex245 of PES packets, respectively, and furthermore, sequences ex242 and ex245 of PES packets are converted into TS packets ex243 and ex246. Multiplexed data ex247 is formed by multiplexing these TS packets into a single stream.

Figure 25:
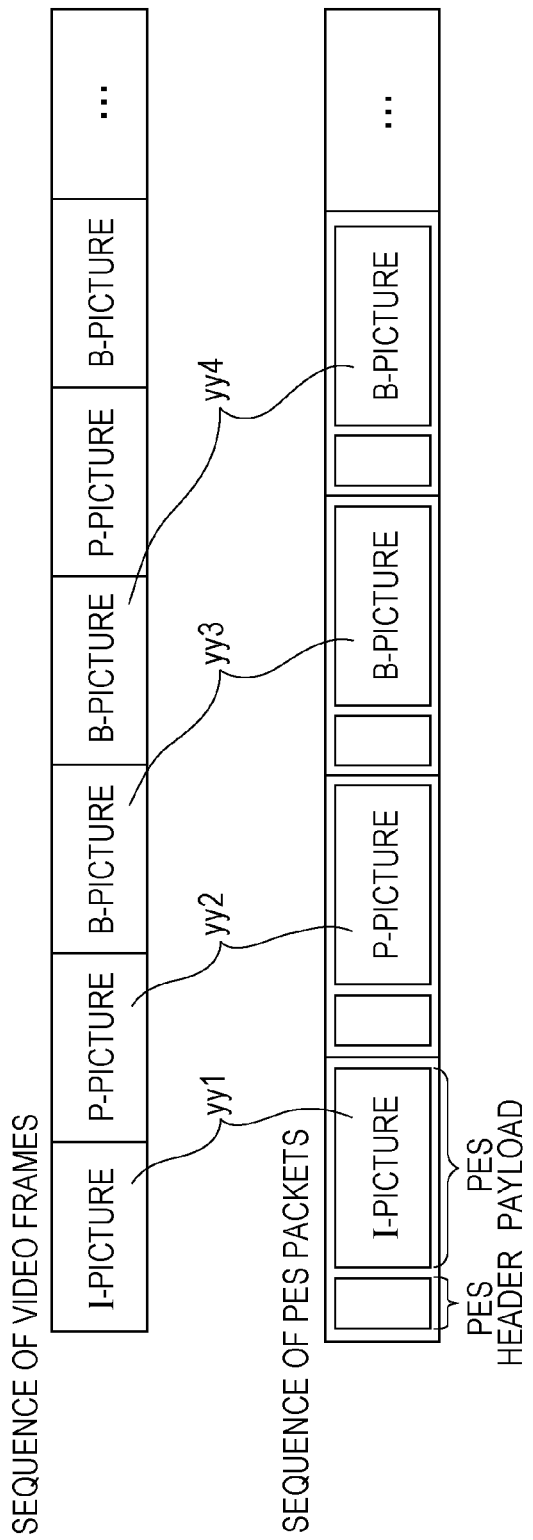
FIG. 25 is a diagram more specifically showing how a video stream is stored in a sequence of PES packets.

FIG. 25 more specifically shows how a video stream is stored in a sequence of PES packets. At a top of FIG. 25 there is shown a sequence of video frames of a video stream. At a bottom there is shown a sequence of PES packets. As indicated by arrows yy1, yy2, yy3, and yy4 in FIG. 25, an I-picture, a B-picture, and a P-picture which are a plurality of video presentation units of the video stream are divided on a picture basis, and are stored in payloads of PES packets. Each PES packet has a PES header. In the PES header are stored a PTS (Presentation Time-Stamp) which is a display time of a picture and a DTS (Decoding Time-Stamp) which is a decoding time of the picture.

Figure 26:
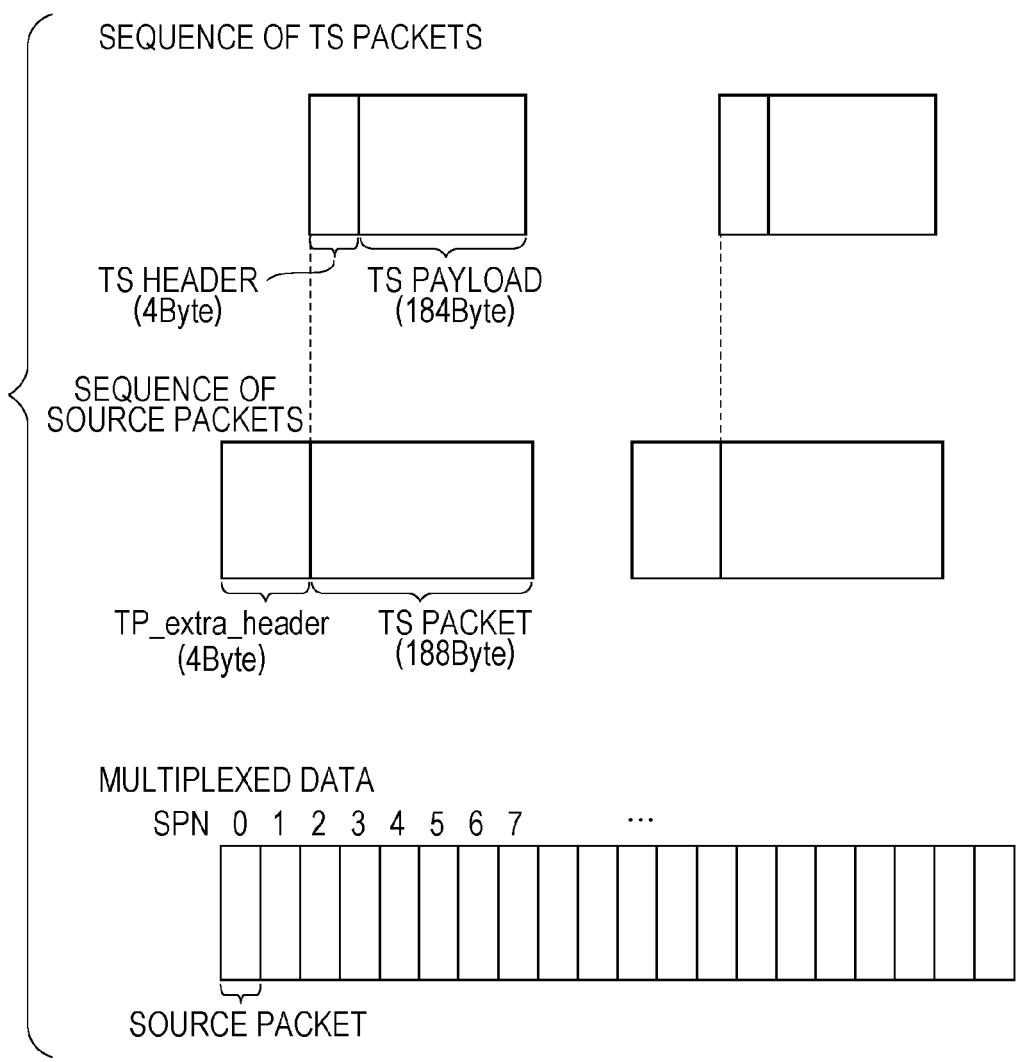
FIG. 26 is a diagram showing structures of a TS packet and a source packet in multiplexed data.

FIG. 26 shows a format of a TS packet which is finally written to multiplexed data. A TS packet is a 188-byte fixed-length packet formed of a 4-byte TS header having information such as a PID that identifies a stream; and a 184-byte TS payload that stores data. The above-described PES packets are divided and stored in TS payloads. In a case of a BD-ROM, a TS packet is provided with a 4-byte TP_extra_header and forms a 192-byte source packet, and is written to multiplexed data. In the TP_extra_header is described information such as an ATS (Arrival_Time_Stamp). The ATS indicates a time of starting transferring the TS packet to a PID filter of a decoder. In the multiplexed data, as shown at a bottom of FIG. 26, source packets are arranged, and a number that is incremented from beginning of the multiplexed data is called SPN (Source Packet Number).

In addition, for the TS packets included in the multiplexed data, in addition to streams of video, audio, subtitles, etc., there are a PAT (Program Association Table), a PMT (Program Map Table), PCR (Program Clock Reference), etc. The PAT indicates what PID of the PMT is used in the multiplexed data, and a PID of the PAT itself is registered as 0. The PMT has PIDs of the respective streams of video, audio, subtitles, etc., included in the multiplexed data, and attribute information of streams associated with the respective PIDs, and has various types of descriptors relating to the multiplexed data. For the descriptors, for example, there is copy control information that instructs allowance/non-allowance of copying of the multiplexed data. To achieve synchronization between ATC (Arrival Time Clock) which is a time base of the ATS and STC (System Time Clock) which is a time base of the PTS and the DTS, the PCR has information on STC time corresponding to the ATS at which the PCR packet is transferred to the decoder.

Figure 27:
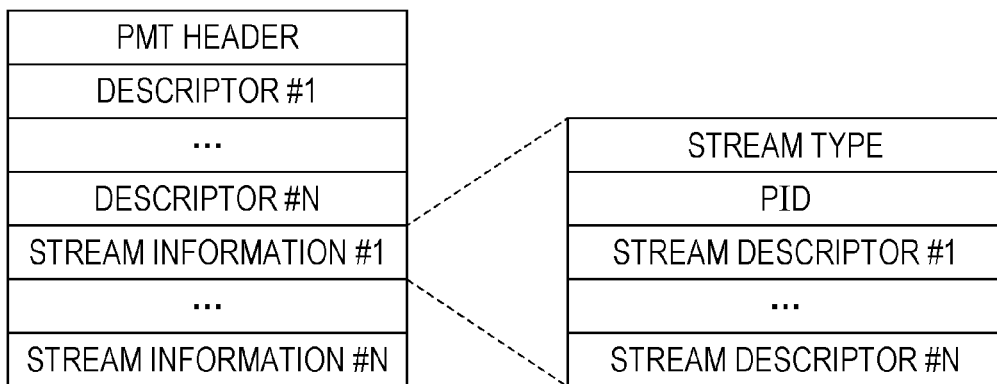
FIG. 27 is a diagram showing a PMT data structure.

FIG. 27 is a diagram specifically describing a PMT data structure. At beginning of a PMT is disposed a PMT header where a length of data included in the PMT, etc., are described. After the PMT header are disposed a plurality of descriptors relating to multiplexed data. The above-described copy control information, etc., are described as descriptors. After each of the descriptors are disposed a plurality of pieces of stream information about streams included in the multiplexed data. Each of the plurality of pieces of stream information is formed of a stream type for identifying a compression codec of a stream, etc.; a PID of the stream; and stream descriptors where pieces of attribute information (frame rate, aspect ratio, etc.) of the stream are described. There are a number of stream descriptors that is equal to a number of streams present in the multiplexed data.

In a case of recording in a recording medium, etc., the above-described multiplexed data is recorded together with a multiplexed data information file.

Figure 28:
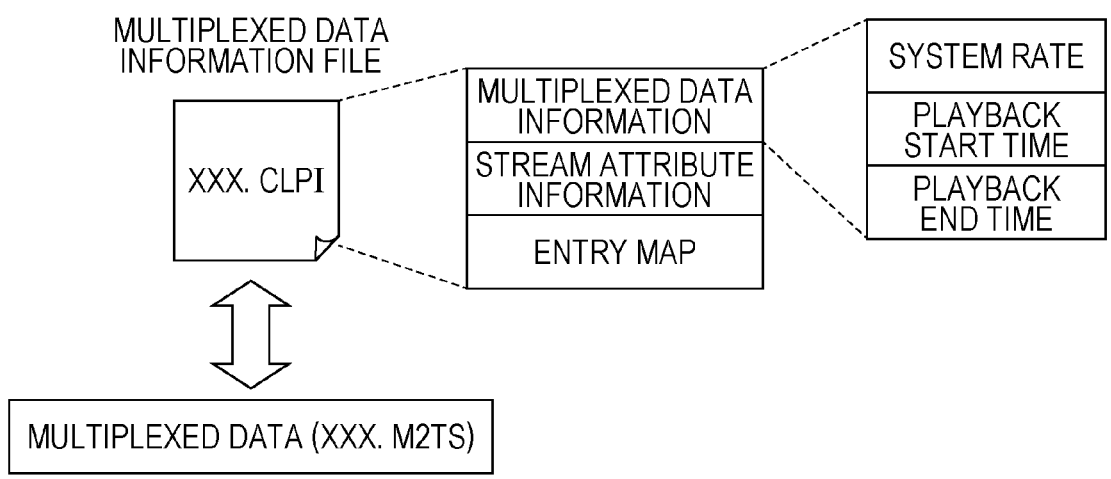
FIG. 28 is a diagram showing an internal configuration of multiplexed data information.

The multiplexed data information file is, as shown in FIG. 28, multiplexed data management information, and has a one-to-one correspondence with multiplexed data, and is formed of multiplexed data information, stream attribute information, and an entry map.

The multiplexed data information is, as shown in FIG. 28, formed of a system rate, a playback start time, and a playback end time. The system rate indicates a maximum transfer rate of the multiplexed data to a PID filter of a system target decoder which will be described later. Intervals between ATSs included in the multiplexed data are set so as to be smaller than or equal to the system rate. The playback start time is a PTS of a first video frame of the multiplexed data, and the playback end time is set to a value obtained by adding a one-frame playback interval to a PTS of a last video frame of the multiplexed data.

As shown in FIG. 29, in the stream attribute information, attribute information about each stream included in the multiplexed data is registered on a PID basis. The attribute information has different information for each of a video stream, an audio stream, a presentation graphics stream, and an interactive graphics stream. The video stream attribute information has, for example, information on what compression codec is used to compress the video stream, information on how much resolution pieces of individual picture data forming the video stream have, information on how much aspect ratio the video stream has, and information on how much frame rate the video stream has. The audio stream attribute information has, for example, information on what compression codec is used to compress the audio stream, information on a number of channels included in the audio stream, information on what languages the audio stream supports, and information on how much sampling frequency the audio stream has. These pieces of information are used, for example, for initialization of a decoder before playback by a player.

In the present exemplary embodiment, of the above-described multiplexed data, the stream type included in the PMT is used. In addition, when multiplexed data is recorded in a recording medium, video stream attribute information included in multiplexed data information is used. Specifically, the methods for encoding a moving image or the moving image encoding devices which are shown in the above-described exemplary embodiments are provided with a step or means of setting unique information in a stream type included in a PMT or in video stream attribute information. The unique information indicates that video data is generated by any of the methods for encoding a moving image or any of the moving image encoding devices which are shown in the above-described exemplary embodiments. By this configuration, it becomes possible to distinguish between video data generated by any of the methods for encoding a moving image or any of the moving image encoding devices which are shown in the above-described exemplary embodiments, and video data that complies with other standards.

In addition, steps of a method for decoding a moving image of the present exemplary embodiment are shown in FIG. 30. At step exS100, a stream type included in a PMT, or video stream attribute information included in multiplexed data information is obtained from multiplexed data. Then, at step exS101, it is determined whether the stream type or the video stream attribute information indicates that the multiplexed data is generated by any of the methods for encoding a moving image or any of the moving image encoding devices which are shown in the above-described exemplary embodiments. Then, if it is determined that the stream type or the video stream attribute information indicates that the multiplexed data is generated by any of the methods for encoding a moving image or any of the moving image encoding devices which are shown in the above-described exemplary embodiments, at step exS102, decoding is performed by an appropriate one of the methods for decoding a moving image which are shown in the above-described exemplary embodiments. If the stream type or the video stream attribute information indicates that the multiplexed data complies with a conventional standard such as MPEG-2, MPEG4-AVC, or VC-1, at step exS103, decoding is performed by a method for decoding a moving image that complies with the conventional standard.

As such, by setting a new unique value in a stream type or video stream attribute information, upon decoding it can be determined whether decoding can be performed by any of the methods for decoding a moving image or any of the moving image decoding devices which are shown in the above-described exemplary embodiments. Therefore, even if pieces of multiplexed data that comply with different standards are input, an appropriate decoding method or device can be selected. Accordingly, decoding can be performed without causing errors. In addition, the method for encoding a moving image or the moving image encoding device, or the method for decoding a moving image or the moving image decoding device, which is shown in the present exemplary embodiment can also be used for any of the above-described devices and systems.

Fourth Exemplary Embodiment

The methods for encoding a moving image and the moving image encoding devices and the methods for decoding a moving image and the moving image decoding device which are shown in the above-described exemplary embodiments are typically implemented by an LSI which is an integrated circuit. As an example, a configuration of LSI ex500 implemented in a single chip is shown in FIG. 31. LSI ex500 includes components ex501, ex502, ex503, ex504, ex505, ex506, ex507, ex508, and ex509 which are described below, and the components are connected to each other through bus ex510. When power is in an on state, power supply circuit unit ex505 supplies power to each component and thereby activates LSI ex500 to an operable state.

For example, when an encoding process is performed, LSI ex500 accepts an AV signal as input from microphone ex117, camera ex113, etc., through AV I/O ex509 based on control of controller ex501 including CPU ex502, memory controller ex503, stream controller ex504, drive frequency controller ex512, etc. The input AV signal is temporarily accumulated in external memory ex511 such as an SDRAM. Based on control of controller ex501, the accumulated data is transmitted to signal processor ex507 such that, for example, the accumulated data is appropriately divided and transmitted in a plurality of different times according to workload or processing speed. Signal processor ex507 performs encoding of an audio signal and/or encoding of a video signal. Here, a video signal encoding process is any of the encoding processes described in the above-described exemplary embodiments. Signal processor ex507 further performs, according to circumstances, for example, a process of multiplexing encoded audio data and encoded video data. The multiplexed data is output to an external source from stream I/O ex506. The output multiplexed data is transmitted toward base station ex107 or written to recording medium ex215. Note that upon multiplexing, to achieve synchronization, the pieces of data may be temporarily accumulated in buffer ex508.

Note that although the above describes that memory ex511 is an external configuration to LSI ex500, a configuration may be such that memory ex511 is included in LSI ex500. Also, a number of buffers ex508 is not limited to one, and a plurality of buffers may be provided. In addition, LSI ex500 may be implemented in a single chip or may be implemented in a plurality of chips.

In addition, although, in the above, controller ex501 includes CPU ex502, memory controller ex503, stream controller ex504, drive frequency controller ex512, etc., a configuration of controller ex501 is not limited this configuration. For example, a configuration may be such that signal processor ex507 further includes a CPU. By signal processor ex507 also including a CPU, processing speed can be further improved. In addition, as another example, a configuration may be such that CPU ex502 includes signal processor ex507 or, for example, an audio signal processor which is a part of signal processor ex507. In such a case, controller ex501 is configured to include CPU ex502 that includes signal processor ex507 or a part of signal processor ex507.

Note that here an LSI is shown, but an integrated circuit may be called an IC, a system LSI, a super LSI, or an ultra LSI, depending on the integration density.

In addition, a technique for achieving an integrated circuit is not limited to an LSI, and may be implemented by a dedicated circuit or a universal processor. An FPGA (Field Programmable Gate Array) that can be programmed after manufacturing an LSI, or a reconfigurable processor that can reconfigure connections or settings of circuit cells in an LSI after manufacturing the LSI may be used. Such programmable logic devices can typically perform the methods for encoding a moving image or the methods for decoding a moving image which are shown in the above-described exemplary embodiments, by loading or reading from a memory or the like a program that forms software or firmware.

Furthermore, if integrated circuit technology that replaces LSI emerges as a result of advances in semiconductor technology or from any other technology derived from the semiconductor technology, then functional blocks may of course be integrated using such technology. Adaptation of biotechnology is a possible example.

Fifth Exemplary Embodiment

In a case of decoding video data generated by any of the methods for encoding a moving image or any of the moving image encoding devices which are shown in the above-described exemplary embodiments, it is considered that workload increases compared to a case of decoding video data that complies with a conventional standard such as MPEG-2, MPEG4-AVC, or VC-1. Hence, LSI ex500 needs to set a higher drive frequency than a drive frequency of CPU ex502 that is set upon decoding video data complying with a conventional standard. However, if the drive frequency is increased, then a problem of an increase in power consumption occurs.

Figure 32:
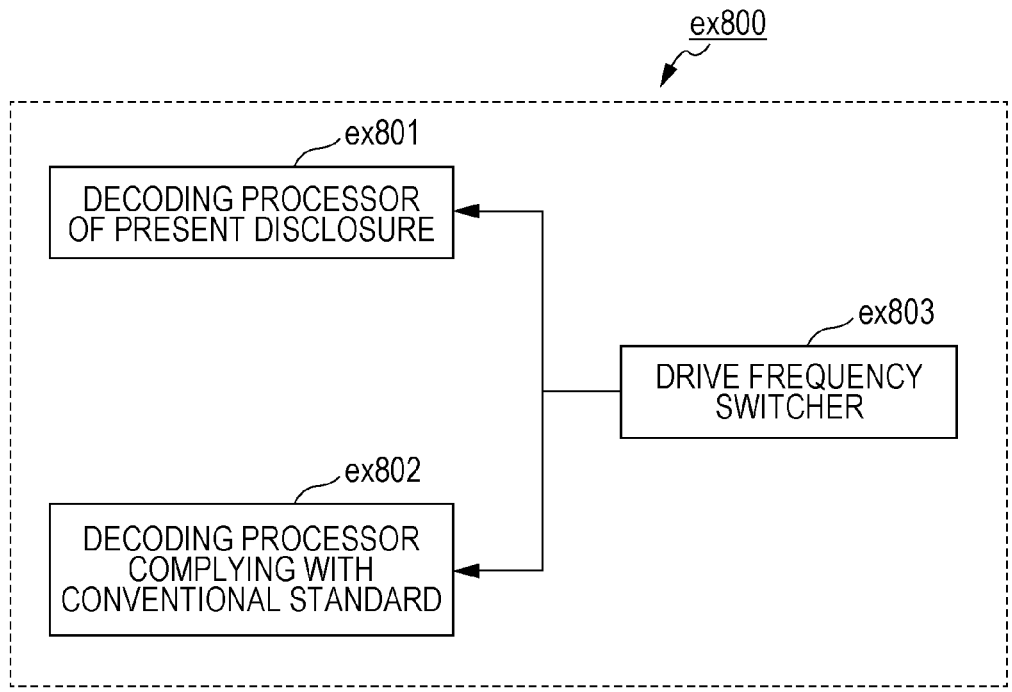
FIG. 32 is a diagram showing a configuration for switching a drive frequency.

To solve this problem, moving image decoding devices such as television ex300 and LSI ex500 are configured to identify which standard a piece of video data complies with, and switch the drive frequency according to the standard. FIG. 32 shows configuration ex800 of the present exemplary embodiment. Drive frequency switcher ex803 sets a high drive frequency when video data is generated by any of the methods for encoding a moving image or any of the moving image encoding devices which are shown in the above-described exemplary embodiments. Then, decoding processor ex801 that performs the methods for decoding a moving image shown in the above-described exemplary embodiments is instructed to decode the video data. On the other hand, when the video data complies with a conventional standard, a lower drive frequency is set compared to that for video data generated by any of the methods for encoding a moving image or any of the moving image encoding devices which are shown in the above-described exemplary embodiments. Then, decoding processor ex802 that complies with the conventional standard is instructed to decode the video data.

More specifically, drive frequency switcher ex803 is formed of CPU ex502 and drive frequency controller ex512 of FIG. 31. In addition, decoding processor ex801 that performs the methods for decoding a moving image shown in the above-described exemplary embodiments and decoding processor ex802 that complies with the conventional standard correspond to signal processor ex507 of FIG. 31. CPU ex502 identifies which standard a piece of video data complies with. Then, based on a signal from CPU ex502, drive frequency controller ex512 sets a drive frequency. In addition, based on a signal from CPU ex502, signal processor ex507 decodes the video data. Here, for the identification of the video data, it is considered to use, for example, identification information described in the third exemplary embodiment. The identification information is not limited to that described in the third exemplary embodiment and may be any information as long as the information can identify which standard the video data complies with. For example, when which standard a piece of video data complies with can be identified based on an external signal that identifies whether the video data is used for a television or used for a disk, the identification may be performed based on such an external signal. In addition, it is considered to perform selection of a drive frequency by CPU ex502 based on, for example, a lookup table where standards of video data and drive frequencies are associated with each other, such as that shown in FIG. 34. By storing the lookup table in buffer ex508 or an internal memory of the LSI and referring to the lookup table by CPU ex502, a drive frequency can be selected.

Figure 33:
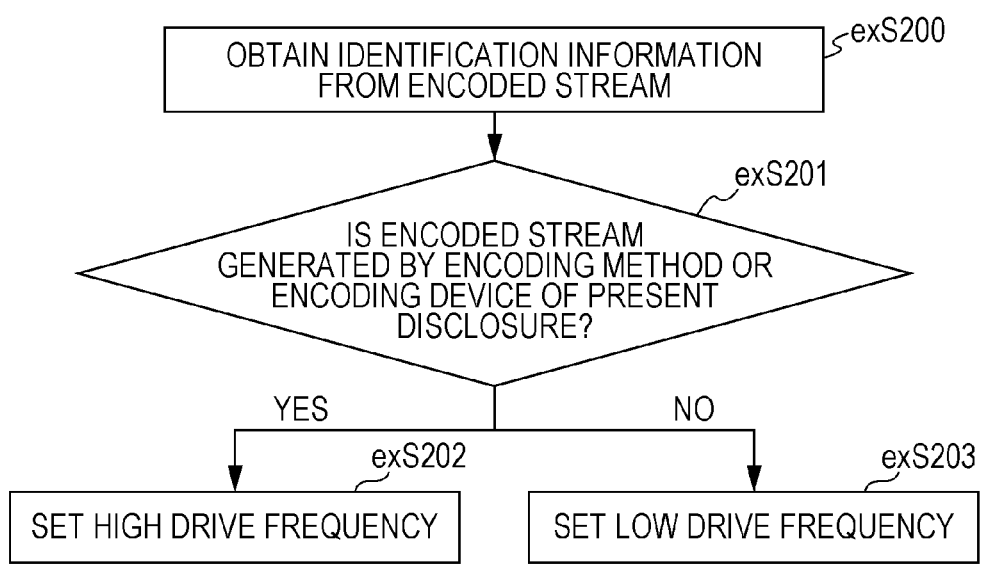
FIG. 33 is a diagram showing steps for identifying video data and switching the drive frequency.

FIG. 33 shows steps for performing a method of the present exemplary embodiment. First, at step exS200, signal processor ex507 obtains identification information from multiplexed data. Then, at step exS201, CPU ex502 identifies, based on the identification information, whether video data is generated by any of the encoding methods or devices shown in the above-described exemplary embodiments. If the video data is generated by any of the encoding methods or devices shown in the above-described exemplary embodiments, at step exS202, CPU ex502 sends a signal for setting a high drive frequency to drive frequency controller ex512. Then, drive frequency controller ex512 sets a high drive frequency. On the other hand, if it is indicated that the video data complies with a conventional standard such as MPEG-2, MPEG4-AVC, or VC-1, at step exS203, CPU ex502 sends a signal for setting a low drive frequency to drive frequency controller ex512. Then, drive frequency controller ex512 sets a low drive frequency compared to a case of video data generated by any of the encoding methods or devices shown in the above-described exemplary embodiments.

By further changing a voltage to be provided to LSI ex500 or a device including LSI ex500 in conjunction with switching of the drive frequency, power-saving effect can be further increased. For example, it is considered that, in a case of setting a low drive frequency, a voltage to be provided to LSI ex500 or a device including LSI ex500 is accordingly set to a low value compared to a case of setting a high drive frequency.

In addition, a method for setting the drive frequency is not limited to the above-described setting method and may be any as long as a high drive frequency is set when workload for decoding is large, and a low drive frequency is set when workload for decoding is small. For example, when workload for decoding video data complying with the MPEG4-AVC standard is larger than workload for decoding video data generated by any of the methods for encoding a moving image or any of the moving image encoding devices which are shown in the above-described exemplary embodiments, it is considered to reverse the above-described drive frequency settings.

Furthermore, the method for setting the drive frequency is not limited to a configuration in which the drive frequency is reduced. For example, it is also considered that, when identification information indicates that video data is generated by any of the methods for encoding a moving image or any of the moving image encoding devices which are shown in the above-described exemplary embodiments, a voltage to be provided to LSI ex500 or a device including LSI ex500 is set to a high value, and when the identification information indicates that video data complies with a conventional standard such as MPEG-2, MPEG4-AVC, or VC-1, a voltage to be provided to LSI ex500 or a device including LSI ex500 is set to a low value. In addition, as another example, it is also considered that, when the identification information indicates that video data is generated by any of the methods for encoding a moving image or any of the moving image encoding devices which are shown in the above-described exemplary embodiments, driving of CPU ex502 is not stopped, and when the identification information indicates that video data complies with a conventional standard such as MPEG-2, MPEG4-AVC, or VC-1, since there is still room for processing, driving of CPU ex502 is temporarily stopped. Even when the identification information indicates that video data is generated by any of the methods for encoding a moving image or any of the moving image encoding devices which are shown in the above-described exemplary embodiments, if there is still room for processing, then it is also considered to temporarily stop driving of CPU ex502. In this case, it is considered to set shorter stop time compared to a case in which the identification information indicates that video data complies with a conventional standard such as MPEG-2, MPEG4-AVC, or VC-1.

By thus switching the drive frequency according to a standard with which a piece of video data complies, power saving can be achieved. In addition, when LSI ex500 or a device including LSI ex500 is driven using a battery, along with power saving, battery life can be extended.

Sixth Exemplary Embodiment

A plurality of pieces of video data complying with different standards may be input to the above-described devices and systems such as a television and a mobile phone. In order that decoding can be performed even when a plurality of pieces of video data complying with different standards are input, signal processor ex507 of LSI ex500 needs to support a plurality of standards. However, if signal processors ex507 that support the respective standards are individually used, then problems of an increase in a circuit size of LSI ex500 and an increase in cost occur.

Figure 35A:
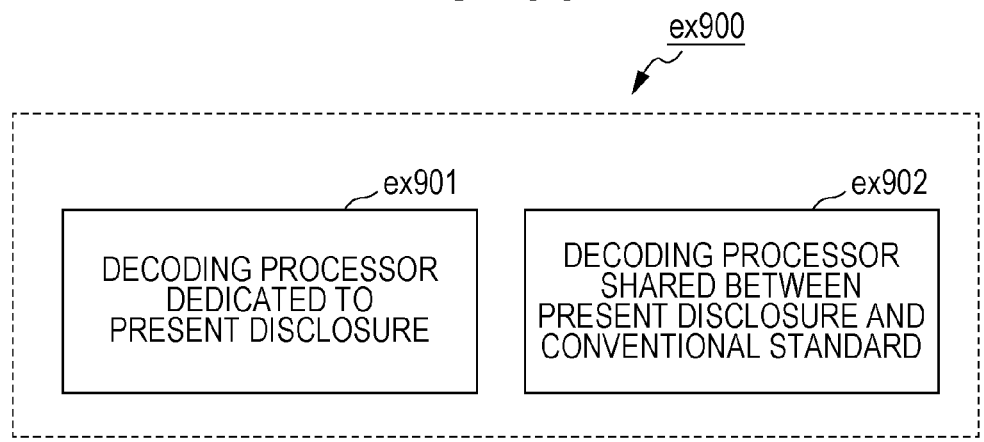
FIG. 35A is a diagram showing an example of a configuration for sharing a module of a signal processor.

To solve the problems, a configuration is employed in which a decoding processor for performing any of the methods for decoding a moving image shown in the above-described exemplary embodiments and a decoding processor that complies with a conventional standard such as MPEG-2, MPEG4-AVC, or VC-1 are partially shared with each other. An example of this configuration is shown in ex900 of FIG. 35A. For example, processing content of processes, such as entropy decoding, inverse quantization, a deblocking filter, and motion compensation, is partially common between the methods for decoding a moving image shown in the above-described exemplary embodiments and a method for decoding a moving image that complies with the MPEG4-AVC standard. A configuration is considered in which, for the common processing content, decoding processor ex902 that supports the MPEG4-AVC standard is shared, and for other processing content that is specific to one aspect of the present disclosure and that is not supported by the MPEG4-AVC standard, dedicated decoding processor ex901 is used. In particular, since one aspect of the present disclosure has a feature in packet rearrangement, it is considered, for example, that for packet arrangement, dedicated decoding processor ex901 is used, and for any or all of other processes including entropy decoding, a deblocking filter, and motion compensation, the decoding processor is shared. Regarding sharing of a decoding processor, a configuration may be such that for common processing content, a decoding processor for performing the methods for decoding a moving image shown in the above-described exemplary embodiments is shared, and for processing content specific to the MPEG4-AVC standard, a dedicated decoding processor is used.

Figure 35B:
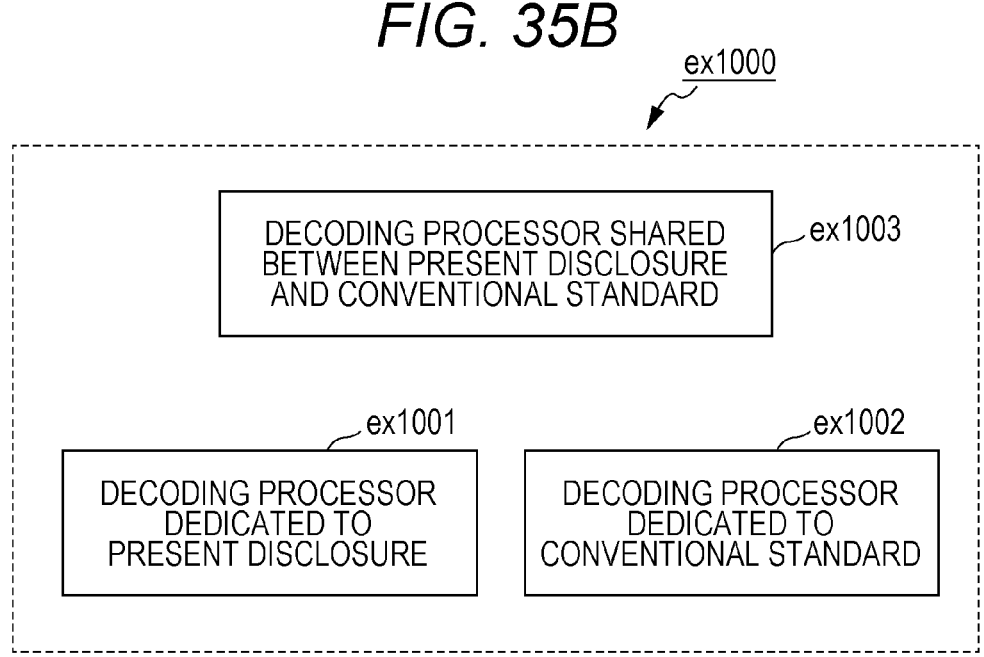
FIG. 35B is a diagram showing another example of a configuration for sharing a module of a signal processor.

In addition, another example of partially sharing processes is shown in ex1000 of FIG. 35B. In this example, a configuration is employed that uses dedicated decoding processor ex1001 that supports processing content specific to one aspect of the present disclosure; dedicated decoding processor ex1002 that supports processing content specific to other conventional standards; and common decoding processor ex1003 that supports processing content common between a method for decoding a moving image according to one aspect of the present disclosure and a method for decoding a moving image of other conventional standards. Here, dedicated decoding processors ex1001 and ex1002 do not necessarily need to be specialized for one aspect of the present disclosure or the processing content specific to other conventional standards, and may be ones that are able to perform other general processes. In addition, the configuration of the present exemplary embodiment can also be implemented on LSI ex500.

By thus sharing a decoding processor for processing content common between a method for decoding a moving image according to one aspect of the present disclosure and a method for decoding a moving image of a conventional standard, a circuit size of the LSI can be reduced and cost can be reduced.

Other Exemplary Embodiments

Although methods for decoding data, data decoding devices, and methods for transmitting data according to one or a plurality of aspects are described above based on the exemplary embodiments, the present disclosure is not limited to these exemplary embodiments. A mode where various modifications with which one skilled in the art would come up are made to the present exemplary embodiments and a mode constructed by combining together components of different exemplary embodiments are also included in the scope of the present disclosure without departing from the spirit and scope of the present disclosure.

For example, although the above-described exemplary embodiments describe an example in which a packet identifier (packet_id) is signaled by a header of an MMT packet, a configuration is not limited thereto. For example, a payload of an MMT packet can also be transmitted using a protocol such as MPEG2-TS or RTP. In this case, the packet identifier may be separately signaled, for example, by a packet header of the protocol or by a defined payload header by defining a payload format for storing MMT in the protocol.

In addition, although the above-described exemplary embodiments describe an example of transmitting one MMT package using a plurality of transmission channels, a plurality of MMT packages may be transmitted using a plurality of transmission channels. In this case, each MMT packet can be filtered using a package identifier (package_id) for identifying a package.

Note that when there is one MMT package and there is one asset forming the MMT package, filtering does not need to be performed.

In addition, in the above-described exemplary embodiments, as long as first buffers 120a and second buffers 160a have a one-to-one correspondence with assets, a number of assets may differ from numbers of first buffers 120a and second buffers 160a. For example, the numbers of first buffers 120a and second buffers 160a may be smaller than the number of assets. Specifically, second buffer 160a does not need to be allocated to an asset that does not require second buffer 160a.

In addition, although the above-described exemplary embodiments show an example in which reordering (rearrangement) is explicitly performed in an MMTB (first buffer), a configuration is not limited thereto. For example, an index number indicating which payload data stored in the MMTB is in which position in a decoding order may be separately managed, and access units may be input to a picture buffer or the like from the MMTB, based on the index number.

In addition, although the above-described exemplary embodiments describe an example in which rearrangement is required when identical assets are transmitted using a plurality of transmission channels, a configuration is not limited thereto. For example, in a communication channel on the Internet, etc., when identical assets are transmitted through one transmission channel, too, arrival order at the system decoder may not match the decoding order. Rearrangement according to the above-described exemplary embodiments can also be applied to this case.

In addition, identification information indicating a system decoder model with which an MMT stream to be transmitted complies may be stored in composition information, auxiliary information such as an MMT message, or the like. The system decoder model is, for example, a basic scheme shown in the first exemplary embodiment and the simple scheme shown in the second variant of the first exemplary embodiment. Note that in addition to the composition information, when an MMT package is transmitted using a protocol such as RTP, identification information indicating a model can also be included in playback auxiliary information in SDP (Session Description Protocol), etc. Alternatively, when an MMT package is transmitted using MPEG-2 TS, identification information indicating a model may be stored in a descriptor specified by the MPEG-2 system, and transmitted as a part of section data such as a PAT (Program Association Table) or a PMT (Program Map Table).

In addition, a playback mode in which an MMT package to be signaled complies with a behavior of the system decoder may be included in auxiliary information. Examples of the playback mode include the MPU mode, the fragment mode, and the media unit mode.

In addition, when an MMT package is used as pre-accumulated content, e.g., when an MMT package is downloaded and then played, the MMT package can be played even if the MMT package does not comply with the system decoder. For example, in particular, in an environment where there is still room for memory or processing speed such as a PC, even if an MMT package does not comply with the system decoder, the MMT package can be played. Therefore, a mode in which compliance with a system decoder model is not guaranteed may be provided and included in auxiliary information.

Alternatively, an MMT profile may be specified according to, for example, the fact that an MMT package: (i) complies with the basic scheme of the system decoder, (ii) complies with the simple scheme of the system decoder, and (iii) does not guarantee compliance with the system decoder. Then, profile information may be separately included in auxiliary information.

In addition, when profile information, etc., are provided on an MPU basis, for example, an MP4 brand may be separately defined and included in an fytp/styp box.

In addition, in MMT, a single stream can be formed by combining data of different assets together. For example, it is assumed that each of a first asset and a second asset is formed of five MPUs, and a decoding time of each MPU and parameters related to the system decoder match between the MPUs of the first and second assets. Here, the parameters are, for example, a buffer occupation amount at a time of start of decoding, and a peak rate at encoding.

At this time, only a third MPU of the first asset is interchanged with a third MPU of the second asset, and for others, MPUs of the first asset are used. Even in this case, a stream obtained after the interchange can also comply with a behavior of the system decoder.

In addition, one MMT packet may be transmitted using a plurality of transmission channels. That is, the same data of the same asset may be transmitted using different transmission channels.

In this case, data having been received first is used as valid data, and data having been received later (redundant data) is discarded. For example, in consideration of deterioration of reception conditions of broadcast waves due to weather deterioration, the same data may be transmitted by communication as well so that data that cannot be obtained from broadcasting can be obtained from the communication. At this time, data having been received on a broadcasting side is discarded.

As such, information for identifying a transmission channel using which redundant data is to be transmitted may be transmitted included in auxiliary information such as composition information. A receiver side determines whether redundant data is to be transmitted. If redundant data is to be transmitted, the receiver side determines whether redundant data has been received.

In addition, the system decoders according to the above-described exemplary embodiments are not limited to MMT. The system decoders can also be applied to other formats in which data of the same package (corresponding to a program in the MPEG-2 system) can be packetized and transmitted using one or more transmission channels. At this time, a minimum unit of packetization is, for example, an access unit or a unit into which an access unit is divided.

Note that components (filtering unit 110, MMT buffer unit 120, decoding order obtainer 130, time obtainer 140, rearranger 150, encoded data memory unit 160, decoder 170, and the like) that compose data decoding device 100 according to the above-described exemplary embodiments may be implemented by software such as a program that is executed on a computer including a CPU (Central Processing Unit), a RAM, a ROM (Read Only Memory), a communication interface, an I/O port, a hard disk, a display, etc., or may be implemented by hardware such as an electronic circuit.

In addition, various changes, replacements, additions, omissions, etc. that fall within the scope of the claims or the range of equivalency of the claims may be made to the above-described exemplary embodiments.

The present disclosure can be used as a method for decoding data, a data decoding device, a method for transmitting data, or the like, and can be used, for example, for a recorder, a television, a tablet terminal device, and a mobile phone.

What is claimed is:

1. A playback method comprising:
   receiving a first packet group transmitted using a specified first transmission channel and a second packet group transmitted using a specified second transmission channel,
   wherein in each of packets of the first packet group and the second packet group, encoded data is stored on a predetermined unit basis, the encoded data being generated by encoding a video signal,
   wherein the encoded data is divided into a plurality of MPUs (Media Processing Units), wherein each of the plurality of MPUs is formed of a plurality of access units to be played back during a predetermined playback period,
   wherein in each of the packets, the encoded data is stored on an access unit basis or on a unit basis, the unit being one of a plurality of units into which an access unit is divided, wherein in each of packets included in the first packet group, sequence number information is stored, the sequence number information indicating a sequence number for identifying an MPU to which access units stored in the packet belong, wherein in each of packets included in the second packet group, sequence number information is stored, the sequence number information indicating a sequence number for identifying an MPU to which access units stored in the packet belong, and wherein in a packet included in the first packet group and a packet included in the second packet group, a same value is stored as the sequence number information, the packets storing access units to be played back during a same playback period;

receiving a control information packet to be transmitted using the first transmission channel or the second transmission channel, the control information packet including time information used to derive decoding times of the access units;

deriving a decoding time for each of the access units using the time information; and when a video signal to be played back during a certain playback period is decoded, decoding access units used for the playback in order of the decoding times from among a plurality of access units transmitted by a packet of the first packet group and a packet of the second packet group, the packets having a same sequence number associated with the playback period, each packet includes an ID indicating an asset, wherein the playback method further comprises sorting each of the packets for each asset using an ID by storing each of the packets in buffers, each of the buffers being associated with a different one of the assets, and wherein the playback method further comprises obtaining flag information indicating whether rearranging for each of the packets using the sequence number is required;

performing the rearranging each of the packets when the flag information indicates the rearranging is required; and avoiding performing the rearranging each of the packets when the flag information indicates the rearranging is not required.

2. The playback method according to claim 1, wherein first encoded data to be transmitted by the first packet group and second encoded data to be transmitted by the second packet group are data for playing back one video signal using both of the first encoded data and the second encoded data.

3. The playback method according to claim 1, wherein first encoded data to be transmitted by the first packet group and second encoded data to be transmitted by the second packet group are data for playing back a video signal using the first encoded data during a first playback period, and playing back a video signal using the second encoded data instead of the first encoded data during a second playback period.

4. The playback method according to claim 1, wherein first encoded data to be transmitted by the first packet group and second encoded data to be transmitted by the second packet group are data for playing back a video signal using only the first encoded data when the second encoded data is not obtained upon playback.

5. The playback method according to claim 1, wherein the first transmission channel is broadcasting and the second transmission channel is communication.

6. The playback method according to claim 1, wherein the first transmission channel and the second transmission channel are broadcasting of different channels.

7. The playback method according to claim 1,
wherein the first asset and the second asset form the encoded data of a single video signal.

8. The playback method according to claim 1,
wherein the sequence number is a different value for each asset and each packet.

9. A generation method comprising:
generating a first packet group to be transmitted using a specified first transmission channel and a second packet group to be transmitted using a specified second transmission channel, by storing encoded data in packets on a predetermined unit basis, the encoded data being generated by encoding a video signal, wherein the encoded data is divided into a plurality of MPUs (Media Processing Units), wherein each of the plurality of MPUs is formed of a plurality of access units to be played back during a predetermined playback period, wherein in each of the packets, the encoded data is stored on an access unit basis or on a unit basis, the unit being one of a plurality of units into which an access unit is divided, wherein in each of packets included in the first packet group, sequence number information is stored, the sequence number information indicating a sequence number for identifying an MPU to which access units stored in the packet belong, and wherein in each of packets included in the second packet group, sequence number information is stored, the sequence number information indicating a sequence number for identifying an MPU to which access units stored in the packet belong; and generating a control information packet to be transmitted using the first transmission channel or the second transmission channel, the control information packet including time information used to calculate decoding times of the respective access units, wherein in a packet included in the first packet group and a packet included in the second packet group, a same value is stored as the sequence number information, the packets storing access units to be played back during a same playback period each packet includes an ID indicating an asset, wherein the generation method further comprises generating information for: 1) sorting each of the packets for each asset using an ID by storing each of the packets in buffers, each of the buffers being associated with a different one of the assets; and 2) rearranging each of the packets using the sequence number, and wherein the generation method further comprises;

generating flag information indicating whether the rearranging for each of the packets using the sequence number is required, rearranging each of the packets when the flag information indicates the rearranging is required, and avoiding the rearranging each of the packets when the flag information indicates the rearranging is not required.

10. A playback device comprising:
a non-transitory memory configured to store a program; and
a hardware processor that executes the program to configure the playback device to:
receive a first packet group transmitted using a specified first transmission channel, a second packet group transmitted using a specified second transmission channel, and a control information packet, wherein in each of packets of the first packet group and the second packet group, encoded data is stored on a predetermined unit basis, the encoded data being generated by encoding a video signal, wherein the encoded data is divided into a plurality of MPUs (Media Processing Units), wherein each of the plurality of MPUs is formed of a plurality of access units to be played back during a predetermined playback period, wherein in the packet, the plurality of pieces of encoded data are stored on an access unit basis or on a unit basis, the unit being one of a plurality of units into which an access unit is divided, wherein in each of packets included in the first packet group, sequence number information is stored, the sequence number information indicating a sequence number for identifying an MPU to which access units stored in the packet belong, wherein in each of packets included in the second packet group, sequence number information is stored; the sequence number information indicating a sequence number for identifying an MPU to which access units stored in the packet belong, wherein in a packet included in the first packet group and a packet included in the second packet group, a same value is stored as the sequence number information, the packets storing access units to be played back during a same playback period, and wherein the control information packet is transmitted using the first transmission channel or the second transmission channel and includes time information used to derive decoding times of the access units;

calculate a decoding time for each of the access units using the time information; and decode, when a video signal to be played back during a certain playback period is decoded, access units used for the playback in order of the decoding times from among a plurality of access units transmitted by a packet of the first packet group and a packet of the second packet group, the packets having a same sequence number associated with the playback period each packet includes an ID indicating an asset, wherein the playback device is configured to sort each of the packets for each asset using an ID by storing each of the packets in buffers, each of the buffers being associated with a different one of the assets, and wherein the playback device is further configured to obtain flag information indicating whether rearranging for each of the packets using the sequence number is required;

perform the rearranging each of the packets when the flag information indicates the rearranging is required; and avoid performing the rearranging each of the packets when the flag information indicates the rearranging is not required.

11. A generation device comprising:

a non-transitory memory configured to store a program; and a hardware processor that executes the program to configure the generation device to: generate a first packet group to be transmitted using a specified first transmission channel and a second packet group to be transmitted using a specified second transmission channel, by storing encoded data in packets on a predetermined unit basis, the encoded data being generated by encoding a video signal, wherein the encoded data is divided into a plurality of MPUs (Media Processing Units), wherein each of the plurality of MPUs is formed of a plurality of access units to be played back during a predetermined playback period, wherein in each of the packets, the encoded data is stored on an access unit basis or on a unit basis, the unit being one of a plurality of units into which an access unit is divided, wherein in each of packets included in the first packet group, sequence number information is stored, the sequence number information indicating a sequence number for identifying an MPU to which access units stored in the packet belong, and wherein in each of packets included in the second packet group, sequence number information is stored, the sequence number information indicating a sequence number for identifying an MPU to which access units stored in the packet belong; and generate a control information packet to be transmitted using the first transmission channel or the second transmission channel, the control information packet including time information used to calculate decoding times of the respective access units, wherein in a packet included in the first packet group and a packet included in the second packet group, a same value is stored as the sequence number information, the packets storing access units to be played back during a same playback period each packet includes an ID indicating an asset, wherein the generation device is configured to generate information for: 1) sorting each of the packets for each asset using an ID by storing each of the packets in buffers, each of the buffers being associated with a different one of the assets; and 2) rearranging each of the packets using the sequence number, and wherein the generation device is further configured to:

generate flag information indicating whether the rearranging for each of the packets using the sequence number is required, rearrange each of the packets when the flag information indicates the rearranging is required, and avoid rearranging each of the packets when the flag information indicates the rearranging is not required.

* * * * *